US012659271B2

(12) United States Patent　　(10) Patent No.:　US 12,659,271 B2
Xiong et al.　　(45) Date of Patent:　Jun. 16, 2026

(54) DATA PROCESSING METHOD AND APPARATUS, AND CHIP

(71) Applicant: HUAWEI TECHNOLOGIES CO., LTD., Shenzhen (CN)

(72) Inventors: Liudong Xiong, Xi'an (CN); Xiangang Zhang, Dongguan (CN); Chunzhi He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 18/456,147

(22) Filed: Aug. 25, 2023

(65) Prior Publication Data

US 2023/0412501 A1　　Dec. 21, 2023

Related U.S. Application Data

(63) Continuation of application No. PCT/CN2022/076961, filed on Feb. 18, 2022.

(30) Foreign Application Priority Data

Feb. 27, 2021　(CN) ......................... 202110221842.X

(51) Int. Cl.
*H04L 45/00*　　(2022.01)
*H04L 45/42*　　(2022.01)
*H04L 45/74*　　(2022.01)

(52) U.S. Cl.
CPC ............ *H04L 45/566* (2013.01); *H04L 45/42* (2013.01); *H04L 45/74* (2013.01)

(58) Field of Classification Search
CPC ....... H04L 45/566; H04L 45/42; H04L 45/74; H04L 45/50; H04L 12/4633; H04L 69/22; H04L 69/321; H04L 69/03
See application file for complete search history.

(56) References Cited

U.S. PATENT DOCUMENTS 6,888,818 B1　　5/2005　Gubbi
2008/0310422 A1 *　12/2008　Booth ..................... H04L 45/00
370/395.53
(Continued)

FOREIGN PATENT DOCUMENTS

CN　　101785280 A　　7/2010
CN　　102143527 B *　9/2013　............. H04L 69/22
(Continued)

OTHER PUBLICATIONS

International Search Report for PCT Application No. PCT/CN2022/076961 dated Feb. 27, 2021, 147 pages.

*Primary Examiner* — Farzana B Huq

(57) ABSTRACT

The technology of this application relates to a data processing method and apparatus, and a chip, to improve resource utilization. In one embodiment, a first field is added to a packet header at a protocol layer. The first field indicates which layer is an upper layer (or an inner layer) of the protocol layer. When data encapsulation or decapsulation is performed based on the first field, an unnecessary protocol layer can be skipped based on a requirement. In another embodiment, a second field is added to a packet header at an encapsulated protocol layer. The second field indicates a packet header format used at the current protocol layer. Different packet header formats include different quantities of fields, different packet header formats include different quantities of bits occupied by same fields, or different packet header formats include different quantities of fields and different quantities of bits occupied by one or more fields.

16 Claims, 15 Drawing Sheets

| | |
|---|---|
| L7 | Application layer |
| L6 | Presentation layer |
| L5 | Session layer |
| L4 | Transport layer |
| L3 | Network layer |
| L2 | Data link layer |
| L1 | Physical layer |

(56)  References Cited

U.S. PATENT DOCUMENTS

| 2016/0261430 | A1  | 9/2016 | Lepp et al. | |
| 2017/0019331 | A1* | 1/2017 | Yong | H04L 45/64 |
| 2020/0123228 | A1* | 4/2020 | Hubbell | A61K 45/06 |
| 2020/0213228 | A1* | 7/2020 | Cheng | H04L 12/4641 |
| 2021/0336893 | A1* | 10/2021 | Li | H04L 47/2425 |
| 2021/0385203 | A1* | 12/2021 | Wang | H04L 63/0428 |

FOREIGN PATENT DOCUMENTS

| CN | 105991625 A | 10/2016 |
| CN | 105992242 A | 10/2016 |
| CN | 110120985 A | 8/2019 |

* cited by examiner

| | |
|---|---|
| L7 | Application layer |
| L6 | Presentation layer |
| L5 | Session layer |
| L4 | Transport layer |
| L3 | Network layer |
| L2 | Data link layer |
| L1 | Physical layer |

FIG. 1

DATA PROCESSING METHOD AND APPARATUS, AND CHIP

CROSS-REFERENCE TO RELATED APPLICATIONS

This application is a continuation of International Application No. PCT/CN2022/076961, filed on Feb. 18, 2022, which claims priority to Chinese Patent Application No. 202110221842.X, filed on Feb. 27, 2021. The disclosures of the aforementioned applications are hereby incorporated by reference in their entireties.

TECHNICAL FIELD

Embodiments of this application relate to the field of communication technologies, and in particular, to a data processing method and apparatus, and a chip.

BACKGROUND

In a current communication network, for example, an Ethernet (ETH)/Internet protocol (IP)/infiniband (IB) network, communication between network devices is implemented by layer. Different network protocols basically comply with a seven-layer open systems interconnection (OSI) model. OSI divides a network into the following seven layers from bottom to top: a physical layer, a data link layer, a network layer, a transport layer, a session layer, a presentation layer, and an application layer.

In a communication network, when a network device at a transmitting end assembles a packet and sends the packet, layers are invoked layer by layer from top to bottom, frame headers at the layers are added layer by layer, and finally the packet is encapsulated and sent to the network. A network device at a receiving end parses the packet layer by layer from bottom to top, and strips the frame headers at the layers layer by layer to obtain user data. The network protocol layers are fixed, and cannot meet current flexible network protocol requirements, resulting in a waste of resources.

SUMMARY

Embodiments of this application provide a data processing method and apparatus, and a chip, to improve resource utilization.

According to a first aspect, an embodiment of this application provides a data processing method. The method is applied to a first network device, and includes: obtaining a first data packet; and adding a packet header at a second protocol layer to the first data packet to obtain a second data packet. The second protocol layer is an outer layer of the first protocol layer. The packet header at the second protocol layer includes a first field. A value of the first field in the packet header at the second protocol layer indicates that an inner layer of the second protocol layer is the first protocol layer.

According to this implementation, a first field is added to a packet header at a protocol layer. The first field indicates which layer is an upper layer (or an inner layer) of the protocol layer. When data encapsulation or decapsulation is performed based on the first field, an unnecessary protocol layer can be skipped based on a requirement, and a packet header at the skipped protocol layer is not encapsulated and decapsulated, thereby reducing a waste of resources.

In a possible implementation, the first protocol layer and the second protocol layer are two adjacent layers in seven layers included in an open systems interconnection OSI model. Alternatively, the first protocol layer and the second protocol layer are two non-adjacent layers in the seven layers included in the open systems interconnection OSI model. Alternatively, the first protocol layer and the second protocol layer are a same layer in the seven layers included in the OSI model.

In a possible implementation, before the adding a packet header at a second protocol layer to the first data packet to obtain a second data packet, the method further includes: determining the value of the first field in the packet header at the second protocol layer based on first configuration information. The first configuration information includes a correspondence between different values of the first field and different protocol layers. According to the foregoing implementation, the first configuration information used to describe a correspondence between protocol layers and values of the first field is preconfigured in the first network device, so that a value of the field is determined based on the first configuration information. This is simple and easy to implement.

In a possible implementation, before the adding a packet header at a second protocol layer to the first data packet to obtain a second data packet, the method further includes: determining the value of the first field in the packet header at the second protocol layer based on second configuration information corresponding to the second protocol layer. The second configuration information includes a correspondence between different values of the first field and different protocol layers at the second protocol layer. In the foregoing implementation, a correspondence between a field value and a protocol layer is separately configured for different protocol layers. Compared with global configuration, this reduces bits occupied by the field, thereby reducing a waste of resources.

In a possible implementation, the determining that the outer layer of the first protocol layer is the second protocol layer includes: determining, based on third configuration information, that the outer layer of the first protocol layer is the second protocol layer. The third configuration information indicates a protocol layer for encapsulating a data packet and an adjacency relationship between different protocol layers. In the foregoing implementation, after the network device is deployed, an adjacency relationship of each protocol layer that needs to be encapsulated may be determined based on a deployed communication scenario, for example, which protocol layers need to be skipped. Therefore, the value of the first field is added based on the adjacency relationship of the protocol layer during encapsulation, so that an unnecessary protocol layer can be skipped based on a requirement, and a packet header at the skipped protocol layer is not encapsulated and decapsulated, thereby reducing a waste of resources.

In a possible implementation, the first data packet includes data to be sent to a second network device, and the method further includes: negotiating protocol layer information with the second network device, where the protocol layer information indicates a protocol layer for encapsulating the data to be sent to the second network device and an adjacency relationship between different protocol layers. The determining that the outer layer of the first protocol layer is the second protocol layer includes: determining, based on the protocol layer information, that the outer layer of the first protocol layer is the second protocol layer. In the foregoing implementation, before sending the data, a network device at a transmitting end may first negotiate, with a network device at a receiving end, a protocol layer that needs to be encapsulated and an adjacency relationship between protocol layers. Different protocol layers are used for encapsulation in different scenarios, so that the solutions provided in this application are flexibly applied to different application scenarios.

In a possible implementation, the packet header at the second protocol layer further includes a second field, and a value of the second field indicates a packet header format used at the second protocol layer. Further, different values of the second field indicate different packet header formats used at the second protocol layer. According to the foregoing implementation, for a protocol layer, a required packet header format may be used for encapsulation or decapsulation. For example, when a field segment is not required, a packet header format that does not include the field segment is selected. For another example, a length of a field segment may be reduced, and a packet header format in which a quantity of bits of the field segment is reduced may be used. This reduces a waste of resources.

In a possible implementation, the adding a packet header at a second protocol layer to the first data packet to obtain a second data packet includes: determining the packet header format at the second protocol layer based on indication information; and adding the packet header at the second protocol layer to the first data packet based on the determined packet header format at the second protocol layer to obtain the second data packet. The indication information indicates the packet header format used at the second protocol layer. According to the foregoing implementation, a packet header format at a protocol layer used at the transmitting end may be preconfigured in the device. In this way, a packet header at the protocol layer may be encapsulated based on configured indication information.

In a possible implementation, the method further includes: receiving the indication information sent by a network management device.

In a possible implementation, the first data packet includes the data to be sent to the second network device. Before the adding a packet header at a second protocol layer to the first data packet to obtain a second data packet, the method further includes:

The first network device negotiates packet header information with the second network device. The packet header information includes information indicating the packet header format used at the second protocol layer. The adding a packet header at a second protocol layer to the first data packet to obtain a second data packet includes: determining the packet header format at the second protocol layer based on the packet header information, and adding the packet header at the second protocol layer to the first data packet based on the determined packet header format at the second protocol layer to obtain the second data packet.

In the foregoing implementation, before sending the data, the network device at the transmitting end may first negotiate, with the network device at the receiving end, a packet header format at a protocol layer that needs to be encapsulated. Packet headers at protocol layers in different formats are encapsulated in different scenarios, so that the solutions provided in this application are flexibly applied to different application scenarios.

In a possible implementation, the adding the packet header at the second protocol layer to the first data packet to obtain the second data packet includes: adding the packet header at the second protocol layer to the first data packet based on the determined packet header format at the second protocol layer and fourth configuration information, to obtain the second data packet. The fourth configuration information includes a correspondence between different values of the second field and different packet header formats used at the second protocol layer.

According to a second aspect, an embodiment of this application provides a data processing method. The method is applied to a second network device and includes: receiving a data packet, where data from a first network device and packet headers at N protocol layers are encapsulated in the data packet, N is an integer greater than 1, the N protocol layers include at least a first protocol layer and a second protocol layer, a packet header at the second protocol layer includes a first field, and a value of the first field indicates that an inner layer of the second protocol layer is the first protocol layer; and when decapsulating the packet header at the second protocol layer for the data packet, decapsulating a packet header at the first protocol layer based on the value of the first field in the packet header at the second protocol layer.

In a possible implementation, the decapsulating a packet header at the first protocol layer based on the value of the first field in the packet header at the second protocol layer includes: determining, based on the value of the first field in the packet header at the second protocol layer and first configuration information, that the inner layer of the second protocol layer is the first protocol layer, where the first configuration information includes a correspondence between different values of the first field and different protocol layers; and decapsulating the packet header at the first protocol layer.

According to this implementation, a first field is added to a packet header at a protocol layer. The first field indicates which layer is an upper layer (or an inner layer) of the protocol layer. When data encapsulation or decapsulation is performed based on the first field, an unnecessary protocol layer can be skipped based on a requirement, and a packet header at the skipped protocol layer is not encapsulated and decapsulated, thereby reducing a waste of resources.

In a possible implementation, the decapsulating a packet header at the first protocol layer based on the value of the first field in the packet header at the second protocol layer includes: determining, based on the value of the first field in the packet header at the second protocol layer and second configuration information corresponding to the second protocol layer, that the inner layer of the second protocol layer is the first protocol layer, where the second configuration information includes a correspondence between different values of the first field and different protocol layers at the second protocol layer; and decapsulating the packet header at the first protocol layer.

In a possible implementation, the packet header at the second protocol layer further includes a second field, and a value of the second field at the second protocol layer indicates a packet header format used at the second protocol layer. The decapsulating the packet header at the second protocol layer for the data packet includes: decapsulating the packet header at the second protocol layer based on the value of the second field at the second protocol layer.

In a possible implementation, the decapsulating the packet header at the second protocol layer based on the value of the second field at the second protocol layer includes:

determining, based on the value of the second field at the second protocol layer and fourth configuration information, the packet header format used at the second protocol layer; and decapsulating the packet header at the second protocol layer based on the packet header format used at the second protocol layer.

The fourth configuration information includes a correspondence between different values of the second field and packet header formats used at the second protocol layer.

According to a third aspect, an embodiment of this application provides a data processing method, applied to a first network device, including: obtaining a data packet; and configuring a second field in a packet header at a protocol layer in the data packet, where a value of the second field indicates a packet header format used at the second protocol layer. Further, different values of the second field indicate different packet header formats used at the second protocol layer.

In a possible implementation, the configuring a second field in a packet header at a protocol layer in the data packet includes: determining the packet header format at the second protocol layer based on indication information, and configuring the second field in the packet header at the protocol layer in the data packet based on the determined packet header format at the second protocol layer. The indication information indicates the packet header format used at the second protocol layer.

In a possible implementation, the method further includes: receiving the indication information from a network management device.

In a possible implementation, the first data packet includes data to be sent to a second network device, and before the configuring a second field in a packet header at a protocol layer in the data packet, the method further includes: negotiating packet header information with the second network device, where the packet header information includes information indicating the packet header format used at the second protocol layer. The configuring a second field in a packet header at a protocol layer in the data packet includes: determining the packet header format at the second protocol layer based on the packet header information, and configuring the second field in the packet header at the protocol layer in the data packet based on the determined packet header format at the second protocol layer.

In a possible implementation, the configuring a second field in a packet header at a protocol layer in the data packet includes: configuring the second field in the packet header at the protocol layer in the data packet based on the determined packet header format at the second protocol layer and fourth configuration information. The fourth configuration information includes a correspondence between different values of the second field and different packet header formats used at the second protocol layer.

In a possible implementation, for example, the protocol layer is referred to as a second protocol layer. The method further includes: configuring a first field in the packet header at the protocol layer in the data packet. A value of the first field indicates that an inner layer of the protocol layer is the first protocol layer.

In a possible implementation, the first protocol layer and the second protocol layer are two adjacent layers in seven layers included in an open systems interconnection OSI model. Alternatively, the first protocol layer and the second protocol layer are two non-adjacent layers in the seven layers included in the open systems interconnection OSI model. Alternatively, the first protocol layer and the second protocol layer are a same layer in the seven layers included in the OSI model.

According to a fourth aspect, an embodiment of this application provides a data processing method. The method is applied to a second network device and includes: receiving a data packet, where data from a first network device and a packet header at a protocol layer are encapsulated in the data packet, the packet header at the protocol layer includes a second field, and a value of the second field at the protocol layer indicates a packet header format used at the protocol layer; and decapsulating the packet header at the protocol layer based on the value of the second field at the protocol layer.

For ease of distinguishing, the protocol layer is referred to as a second protocol layer. The data packet may include N protocol layers, and the N protocol layers include at least the second protocol layer. For example, a first protocol layer may be further included. The first protocol layer may be an inner layer of the second protocol layer.

In a possible implementation, the decapsulating the packet header at the second protocol layer based on the value of the second field at the second protocol layer includes: determining, based on the value of the second field at the second protocol layer and fourth configuration information, the packet header format used at the second protocol layer; and decapsulating the packet header at the second protocol layer based on the packet header format used at the second protocol layer. The fourth configuration information includes a correspondence between different values of the second field and packet header formats used at the second protocol layer.

In a possible implementation, the packet header at the second protocol layer further includes a first field, and a value of the first field indicates that an inner layer of the second protocol layer is the first protocol layer. The method further includes: when decapsulating the packet header at the second protocol layer for the data packet, decapsulating a packet header at the first protocol layer based on the value of the first field in the packet header at the second protocol layer.

According to a fifth aspect, an embodiment of this application provides a data processing apparatus. The method is applied to a network device, and may be implemented by a processor in the network device, or may be implemented by a network interface card in the network device. The apparatus includes a first protocol layer module and a second protocol layer module.

The first protocol layer module is configured to send a first data packet to the second protocol layer module. The second protocol layer module is configured to add a packet header at a second protocol layer to the first data packet to obtain a second data packet. The packet header at the second protocol layer includes a first field. A value of the first field in the packet header at the second protocol layer indicates that an inner layer of the second protocol layer is a first protocol layer.

In the fifth aspect, for another optional implementation of the data processing apparatus, refer to related content of the first aspect.

According to a sixth aspect, an embodiment of this application provides a data processing apparatus. The method is applied to a network device, and may be implemented by the network device, may be implemented by a processor in the network device, or may be implemented by a network interface card in the network device. The apparatus includes a first protocol layer module and a second protocol layer module.

The second protocol layer module is configured to receive a data packet. Data from a first network device and packet headers at N protocol layers are encapsulated in the data packet. The N protocol layers include at least a first protocol layer and a second protocol layer. A packet header at the second protocol layer includes a first field. A value of the first field in the packet header at the second protocol layer indicates that an inner layer of the second protocol layer is the first protocol layer. When decapsulating the packet header at the second protocol layer for the data packet to obtain a second data packet, the second protocol layer module sends, to the first protocol layer module based on the value of the first field in the packet header at the second protocol layer, the second data packet obtained after the packet header at the second protocol layer is decapsulated. The first protocol layer module is configured to decapsulate a packet header at the first protocol layer.

In addition, in the sixth aspect, for another optional implementation of the data processing apparatus, refer to related content of the second aspect.

According to a seventh aspect, an embodiment of this application provides a data processing apparatus. The method is applied to a network device, and may be implemented by a processor in the network device, or may be implemented by a network interface card in the network device. The apparatus includes a protocol layer module, configured to: obtain a data packet; and configure a second field in a packet header at a protocol layer in the data packet. A value of the second field indicates a packet header format used at the protocol layer. For example, the data processing apparatus includes at least two protocol layer modules, and a first protocol layer module and a second protocol layer module are used as an example.

The first protocol layer module is configured to send a first data packet to the second protocol layer module. A packet header at a first protocol layer is encapsulated in the first data packet. The second protocol layer module is configured to add a packet header at a second protocol layer to the first data packet to obtain a second data packet. The packet header at the second protocol layer includes the second field. The value of the second field in the packet header at the second protocol layer indicates a packet header format used at the second protocol layer. Different values of the second field indicate different packet header formats used at the second protocol layer. For example, the packet header at the first protocol layer includes the second field, and the value of the second field in the packet header at the first protocol layer indicates a packet header format at the first protocol layer.

In addition, in the seventh aspect, for another optional implementation of the data processing apparatus, refer to related content of the third aspect.

According to an eighth aspect, an embodiment of this application provides a data processing apparatus. The method is applied to a network device, and may be implemented by the network device, may be implemented by a processor in the network device, or may be implemented by a network interface card in the network device. The apparatus includes a protocol layer module.

The second protocol layer module is configured to receive a data packet. Data from a first network device and a packet header at a protocol layer are encapsulated in the data packet. The packet header at the protocol layer includes a second field. A value of the second field at the protocol layer indicates a packet header format used at the protocol layer. When decapsulating the packet header at the protocol layer for the data packet, the protocol layer module decapsulates the packet header at the protocol layer based on the value of the second field at the protocol layer.

In addition, in the eighth aspect, for another optional implementation of the data processing apparatus, refer to related content of the fourth aspect.

According to a ninth aspect, a data processing apparatus is provided. The data processing apparatus includes a processor and a network interface card. The network interface card is configured to receive a data packet sent by the processor, or send a data packet to the processor. The processor is configured to implement the method according to any one of the implementations of the first aspect to the fourth aspect. Alternatively, the processor is configured to send a data packet to the network interface card, or receive a data packet from the network interface card. The network interface card is configured to implement the method according to any one of the implementations of the first aspect to the fourth aspect.

According to a tenth aspect, a chip is provided. The chip includes a processor and an interface. The controller and the interface cooperate with each other, so that the chip performs the method according to any one of the implementations of the first aspect to the fourth aspect.

According to an eleventh aspect, this application provides a chip, including a memory and a controller. The memory is configured to store a computer program. The controller is configured to execute the computing program stored in the memory, to implement the method described in any one of the possible implementations of the first aspect to the fourth aspect.

According to a twelfth aspect, a computer-readable storage medium is provided. The computer-readable storage medium stores instructions. When the instructions are run on a computer, the computer is enabled to perform the method according to any one of the implementations of the first aspect to the fourth aspect.

According to a thirteenth aspect, a computer program product is provided. When the computer program product runs on a computer, the computer is enabled to perform the method according to any one of the implementations of the first aspect to the fourth aspect.

BRIEF DESCRIPTION OF DRAWINGS

FIG. 1 is an example schematic diagram of a seven-layer OSI protocol according to an embodiment of this application;

DESCRIPTION OF EMBODIMENTS

Figure 2:
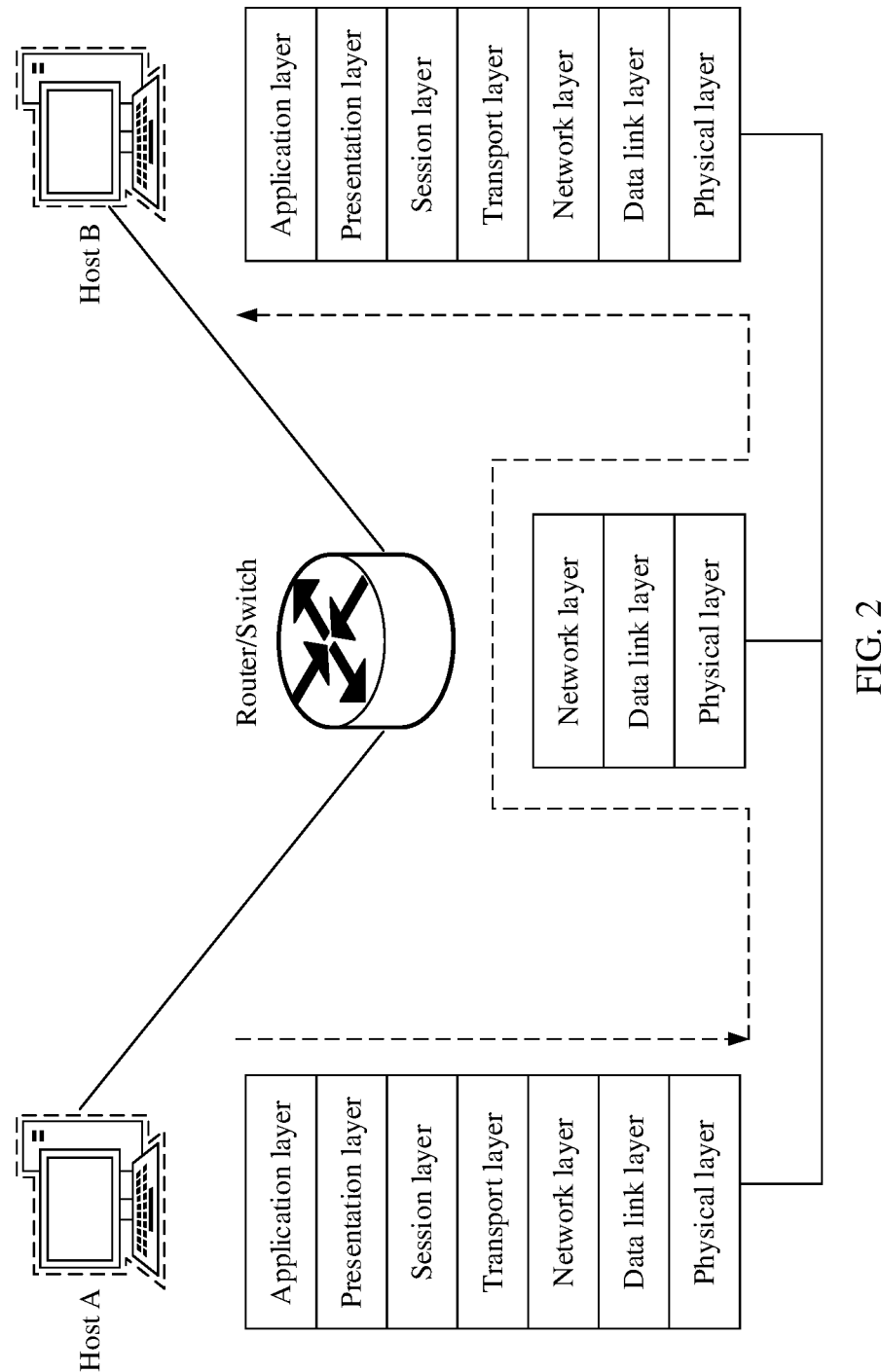
FIG. 2 is an example schematic flowchart of a data transmission process in an OSI model according to an embodiment of this application.

In descriptions of embodiments of this application, unless otherwise specified, "/" means "or". For example, A/B may represent A or B. In this specification, "and/or" describes only an association relationship between associated objects and represents that at least three relationships may exist. For example, A and/or B may represent the following three cases: Only A exists, both A and B exist, and only B exists. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of embodiments of this application, unless otherwise specified, "a plurality of" means two or more than two.

In embodiments of this application, words such as "example" or "for example" are used to represent giving an example, an illustration, or a description. Any embodiment or implementation scheme described as an "example" or "for example" in embodiments of this application should not be explained as being more preferred or having more advantages than another embodiment or implementation scheme. Exactly, use of the word "example", "for example", or the like is intended to present a related concept in a specific manner.

It should be noted that, in embodiments of this application, reference numerals and letters in the following accompanying drawings represent similar items. Therefore, once an item is defined in an accompanying drawing, the item does not need to be further defined or interpreted in the following accompanying drawings.

In the descriptions of this application, it should be further noted that, unless otherwise specified and limited, the terms "setting", "installation", "connecting", and "connected" should be understood in a broad sense, for example, may be a fixed connection, a detachable connection, or an integrated connection; may be a mechanical connection or an electrical connection; may be directly connected, may be indirectly connected by using an intermediate medium, or may be internally connected between two components. An ordinary technician in the art may understand specific meanings of the foregoing terms in this application based on a specific situation.

For ease of understanding, technical features in embodiments of this application are described first.

Network communication between computers is transmitted in a hierarchical manner. Different layers comply with different network protocols. The different network protocols basically comply with a seven-layer open systems interconnection (OSI) model. A concept of OSI is defined by the International Organization for Standardization (ISO). It is a flexible, robust, and interoperable model, rather than a protocol, and is often used to analyze and design a network architecture. The OSI model aims to standardize interconnection standards of different network systems, so that two different systems can easily communicate without changing underlying hardware or software logic.

As shown in FIG. 1, OSI divides a network into the following seven layers from bottom to top: a physical layer, a data link layer, a network layer, a transport layer, a session layer, a presentation layer, and an application layer. A first layer (L1, that is, the physical layer) to a fourth layer (L4, that is, the transport layer) from bottom to top perform data transmission of an underlying physical network. A fifth layer (L5) to a seventh layer (L7) from bottom to top perform data transmission between hosts.

The following describes functions of the seven layers in detail.

The application layer L7 provides an application interface for a system.

The presentation layer L6 performs data format conversion to ensure that data at the application layer generated by the system can be identified and understood by an application layer of another system.

The session layer L5 sets up, manages, and terminates a session between two communication parties.

The transport layer L4 sets up, maintains, or cancels an end-to-end data transmission process, controls a transmission pace, adjusts a data sequence, and the like.

The network layer L3 defines a logical address and forwards data from a source to a destination.

The data link layer L2 encapsulates packet data into frames, implements point-to-point or point-to-multipoint direct communication of data on a data link, detects errors, and the like.

The physical layer L1 sets up, maintains, or disconnects a physical connection, transmits a bit stream on a medium, and provides mechanical and electrical specifications.

Optionally, a five-layer protocol may be used in some application scenarios. In the five-layer protocol, L5 to L7 may be combined into an application layer, and L5 to L7 may also be referred to as an upper layer protocol layer (which may be referred to as an upper layer for short) or a higher layer protocol layer (which may be referred to as a higher layer for short).

For example, for a data transmission process in the OSI model, refer to FIG. 2. For a session layer, a presentation layer, and an application layer, no matter which protocol is used by a transmit host to send data to a receive host, an intermediate switch or router for forwarding considers the three layers transparent, and only data protocol interconnection and interpretation are performed between hosts. A physical layer, a data link layer, a network layer, and a transport layer send data from a network interface card of the transmit host to a network interface card of the receive host through forwarding devices such as a network switch or router, and then to an upper layer protocol of the receive host.

This embodiment of this application may be applied to communication networks such as an Ethernet (ETH)/internet protocol (IP)/infiniband (IB) network.

The ETH/IP network is used as an example. A protocol suite implemented based on the seven-layer OSI model supports various basic protocols and extended derivative protocols at different layers.

In an example, the following uses an example to describe protocols that are respectively supported by the seven layers.

The application layer L7 supports the following protocols: a simple network management protocol (SNMP), a wireless application protocol (WAP), a dynamic host configuration protocol (DHCP), a session initiation protocol (SIP), a hypertext transfer protocol (HTTP), a domain name system (DNS) protocol, a file transfer protocol (FTP), and the like.

The presentation layer L6 supports the following protocols: an American information interchange standard code (American standard code for information interchange, ASCII) protocol, a moving picture experts group (MPEG) protocol, an abstract syntax notation one (ASN.1) protocol, a joint photographic experts group (JPEG) protocol, and the like.

The session layer L5 supports the following protocols: a remote authentication dial-in user service (RADIUS) protocol, a diameter protocol, a general packet radio service (GPRS) tunneling protocol (GTP), a GTP-control (GTP-C) V0/V1/V2 protocol, a GTP-user (GTP-U) protocol, and the like.

The transport layer L4 supports the following protocols: a load balancing protocol, a security and virtual private network (VPN) protocol, an access control list (ACL) protocol, a quality of service (QoS) protocol, a transmission control protocol (TCP), a user datagram protocol (UDP), a stream control transmission protocol (SCTP), a network address translation (NAT) protocol, a real-time transport protocol (RTP)/RTP control protocol (RTCP), and the like.

The network layer L3 supports the following protocols: a generic routing encapsulation (GRE) protocol, an open shortest path first (OSPF) protocol, an IP protocol (such as IPv4 or IPv6), a multicast protocol, an internet control message protocol (ICMP), a static routing protocol, a subnet mask protocol, a bidirectional forwarding detection (BFP) protocol, a virtual router redundancy protocol (VRRP), a multi-protocol label switching (MPLS) protocol, and the like.

The data link layer L2 supports the following protocols: an address resolution protocol (ARP), an ARP proxy protocol, an 802.3ae protocol, a frame relay (FR) protocol, a layer 2 tunneling protocol (L2TP), an MPLS protocol, a switching technology protocol, a virtual local area network (VLAN) protocol, an Ethernet link aggregation (eth-trunk) protocol, an asynchronous transfer mode (ATM) protocol, and the like.

The physical layer L1 supports the following protocols: an Ethernet protocol, an optical fiber mode protocol, an interface type protocol, a simplex/duplex protocol, and the like.

It should be understood that different network protocols use different packet header formats. For example, refer to FIG. 3A, FIG. 3B, and FIG. 3C. An example includes a packet header format at L2, an IP protocol packet header format at L3, and a TCP packet header format at L4.

Figure 3A:
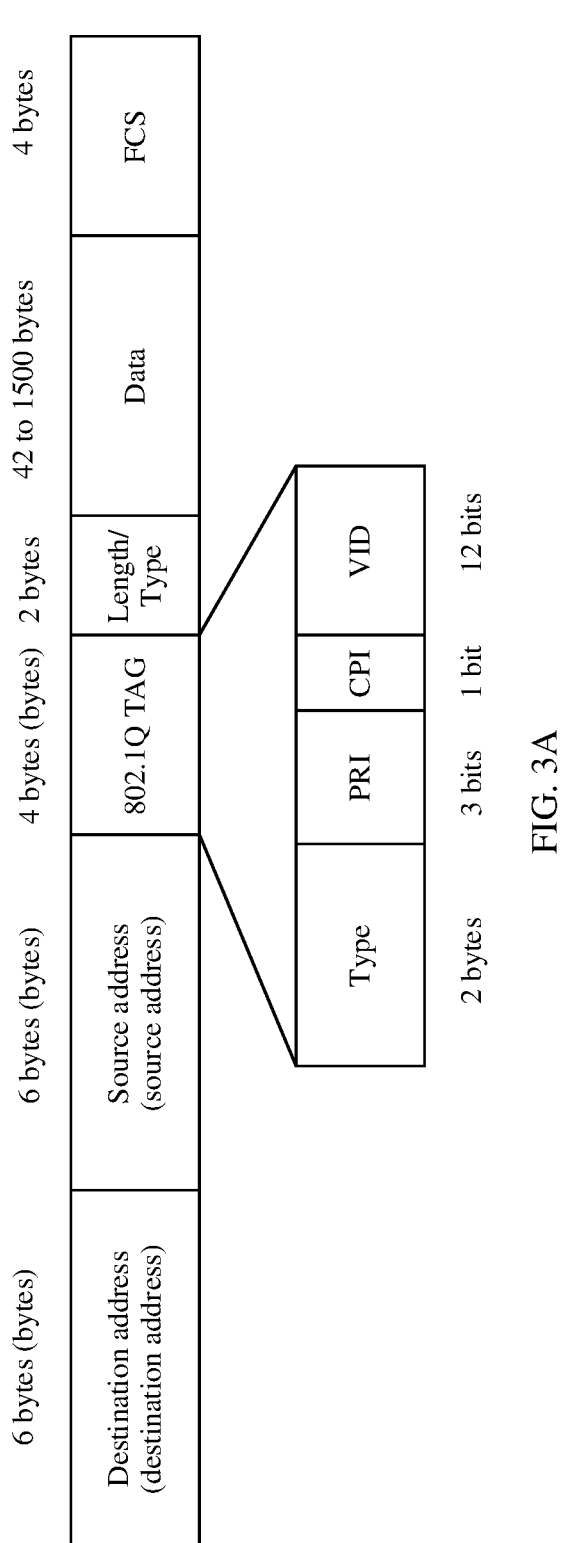
FIG. 3A is an example schematic diagram of a possible L2 packet header format according to an embodiment of this application.

FIG. 3A is a schematic diagram of a possible L2 packet header format. A destination address field indicates a media access control (MAC) address of a receiver of a data packet. This address is used to transmit a network packet over a local area network (LAN). A source address field indicates a MAC address of a sender of the data packet. The receiver determines the sender of the data packet based on the source address. In a length (length)/type (type) field, a length indicates a data length, and a type indicates a protocol type. A frame check sequence (FCS) field indicates data frame trailer check, which is used to check whether the received data packet is complete. A type (Type) field in a tag field indicates a frame type. The type field in the 802.1Q tag is a fixed value 0x8100. If a device that does not support 802.1Q receives an 802.1Q frame, it discards the frame. A PRI (priority) field indicates a priority of an Ethernet frame, with a value ranging from 0 to 7. A larger value indicates a higher priority. A canonical format indicator (CFI) field indicates whether a MAC address is in a classic format. A CFI having a value of 0 indicates that a MAC address is in a classic format. A CFI having a value of 1 indicates that a MAC address is not in a classic format. In an Ethernet frame, a value of the CFI is 0. A VID field indicates a VLAN ID.

Figures 3B, 3C:
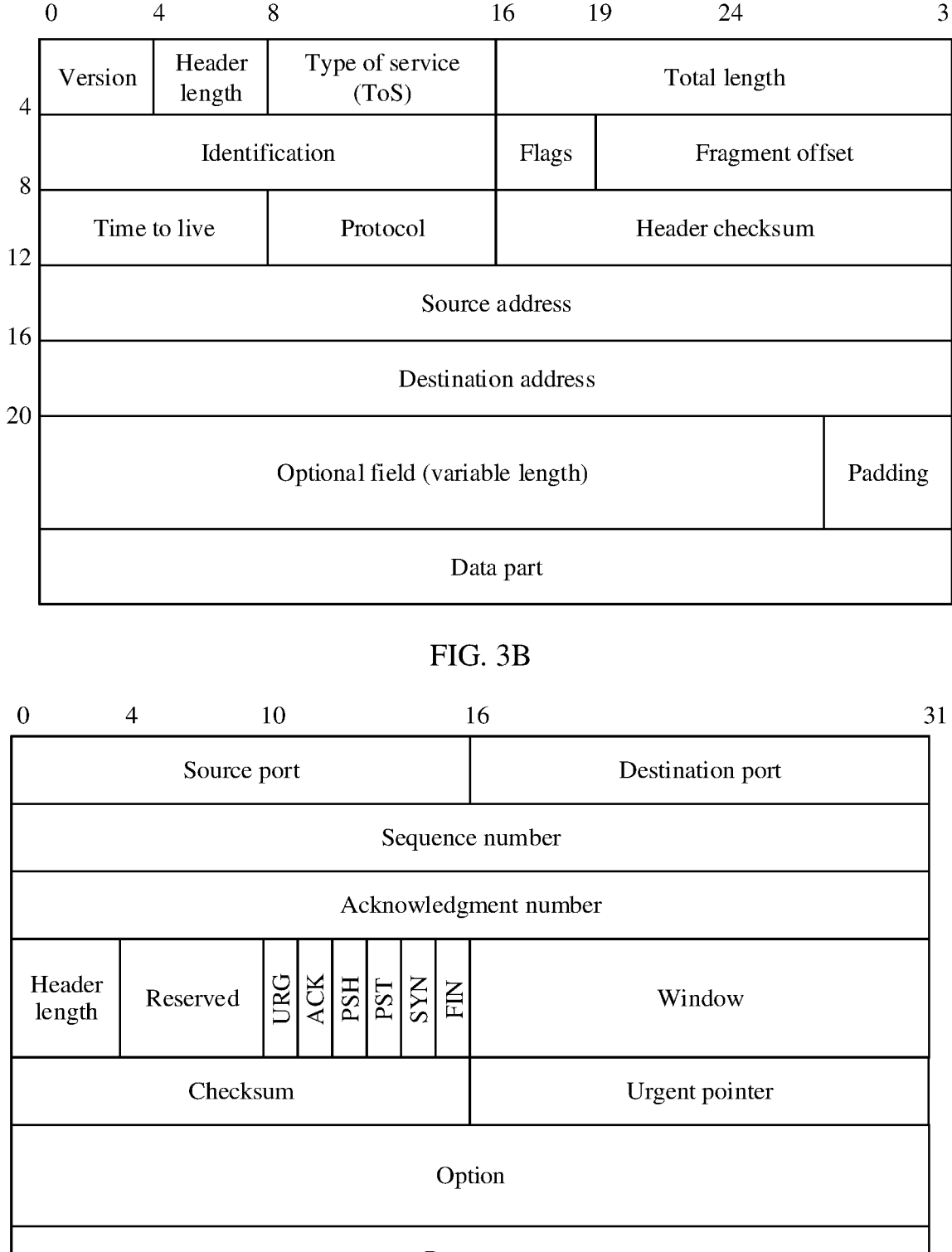
FIG. 3B is an example schematic diagram of a possible L3 packet header format according to an embodiment of this application.
FIG. 3C is an example schematic diagram of a possible L4 packet header format according to an embodiment of this application.

FIG. 3B is a schematic diagram of a possible IP protocol packet header format. A version (Version) field in an IP packet header indicates an IP version number of a data packet. A header length (header length) field indicates a length of a packet header of the data packet. A total length (total length) field indicates a total length of the data packet, and may be used to calculate a length of a payload in the data packet. An identification (identification) field has a length of 16 bits, and is usually used for data packet fragmentation with a flags field and a fragment offset field. If an original length of a data packet exceeds a maximum transmission unit (MTU) of a data link through which the data packet is to pass, the data packet needs to be fragmented into smaller data packets. For example, when a data packet with a size of 5000 bytes passes through a network, if a data link with an MTU of 1500 bytes is encountered, that is, a data frame contains a data packet with a maximum size of 1500 bytes. Before framing a data packet, a node needs to segment the data packet into a plurality of data packets. A length of each data packet cannot exceed 1500 bytes. Then, a router adds a same flag to a flags field of each data packet, so that a receiving device can identify a segment that belongs to a same data packet. A flags (IP flags) field has a length of 3 bits, and a first bit is not used. A second bit is a don't fragment (DF) bit, and the router cannot fragment a data packet after the second bit is set to 1. If the data packet exceeds an MTU value, the router cannot forward the data packet, but discards the data packet, and sends an error message to a source. A fragment offset (fragment offset) field has a length of 13 bits, and indicates an offset of a fragment start point relative to a header start point. Fragments may arrive out of order, and the fragment offset field may allow a receiver to reassemble a data packet in a correct order. A time to live (time to live) field has a length of 8 bits, and indicates a quantity of hops for transmission. A protocol (protocol) field has a length of 8 bits, and indicates a protocol number of the data packet. A header checksum (header checksum) field is an error correction field for the IP packet header. A source address (source address) field and a destination address (destination address) field respectively indicate an IP address of a source node and an IP address of a destination node of the data packet. There is an options (options) field, where a data part is data carried in the data packet.

FIG. 3C is a schematic diagram of a possible TCP packet header format. A source port field indicates a port number of a transmitting end, and a destination port field indicates a port number of a receiving end. A sequence number field, also referred to as a sequence number, indicates a number of a first byte of data sent in a data packet. An acknowledgment number field indicates a number of a first byte of a next packet segment that a receiver expects to receive from a sender. A header length field indicates a length of a TCP packet. A URG (urgent) field indicates whether data sent in the TCP packet contains urgent data. The following urgent pointer (urgent pointer) field is valid only when URG=1. ACK (acknowledge) indicates whether the previous acknowledgment number field is valid. The acknowledgment number field is valid only when ACK=1. PSH (push) is used to prompt the receiving end that an application program should immediately read data from a TCP receiving buffer, to free up space for receiving subsequent data. If a value is 1, the receiver should immediately submit the data to an upper layer application instead of buffering the data. If the application does not read the received data, the data stays in the TCP receiving buffer. RST (reset) indicates that a connection is reset. SYN (synchronous) indicates that a connection is set up. When SYN=1 and ACK=0, it indicates that the packet is a packet segment for requesting to set up a connection. When SYN=1 and ACK=1, it indicates that a peer end agrees to set up a connection. FIN indicates that the peer end is notified that a local end needs to close the connection. A window field indicates an amount of data that can be sent by the peer end. A checksum field is used to provide additional reliability. The urgent pointer (urgent pointer) field marks a position of the urgent data in a data field.

Figure 4:
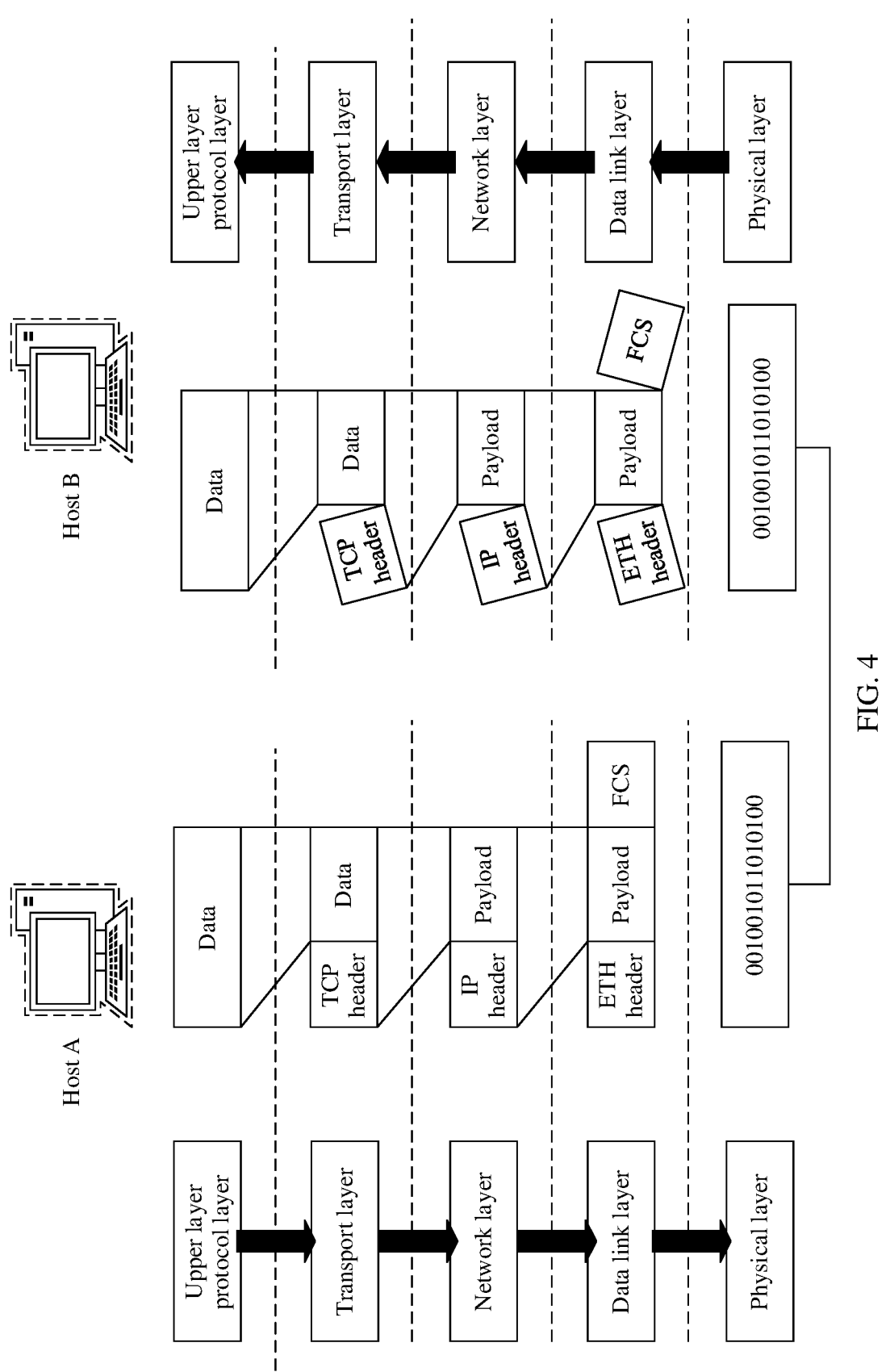
FIG. 4 is an example schematic flowchart of encapsulating and decapsulating a data packet in an ETH/IP network according to an embodiment of this application.

Refer to FIG. 4. An ETH/IP network is used as an example to illustrate a process of encapsulating and decapsulating a data packet. For example, a data link layer uses an eth protocol, a network layer uses an IP protocol, and a transport layer uses a TCP protocol. On the ETH/IP network, when a transmit host assembles a data packet, layers are invoked layer by layer from top to bottom, packet headers are added layer by layer, and finally an encapsulated data packet is sent to the network through a network interface card. When receiving the data packet, the receiving end parses the data packet layer by layer from bottom to top, packet headers at layers are stripped layer by layer, and finally user data is sent to an upper layer application.

The following briefly describes an IB technology. The IB technology is not used for common network connections. It is designed to solve a connection problem of a server. The IB technology is applicable to communication between servers (for example, replication and distributed working), between a server and a storage device (for example, a storage area network (SAN) and a direct storage attachment), and between a server and a network (for example, a local area network, a wide area network, and the Internet).

Figure 5:
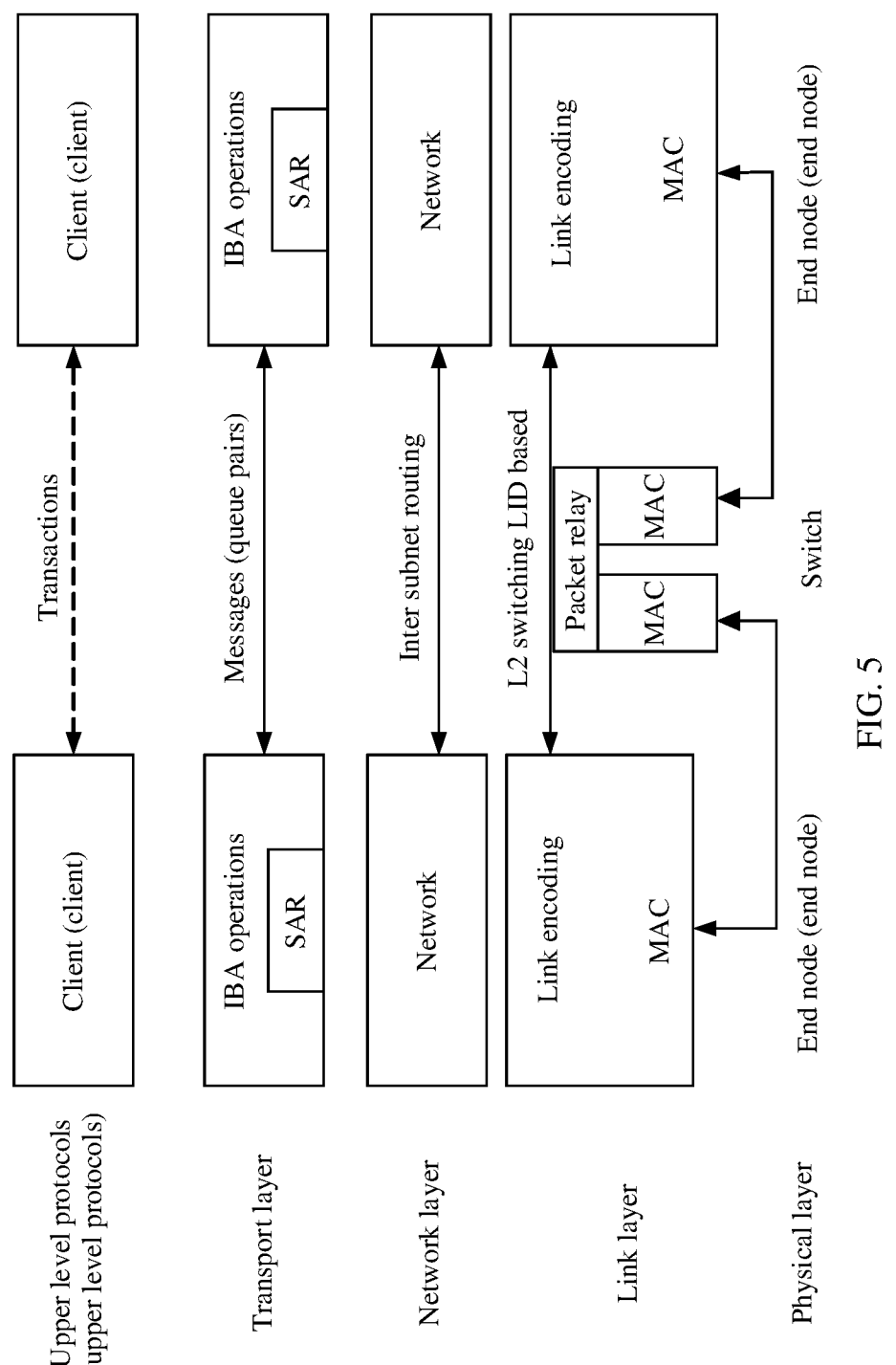
FIG. 5 is an example schematic diagram of an architecture of an IB network according to an embodiment of this application.
Figures 6, 7:
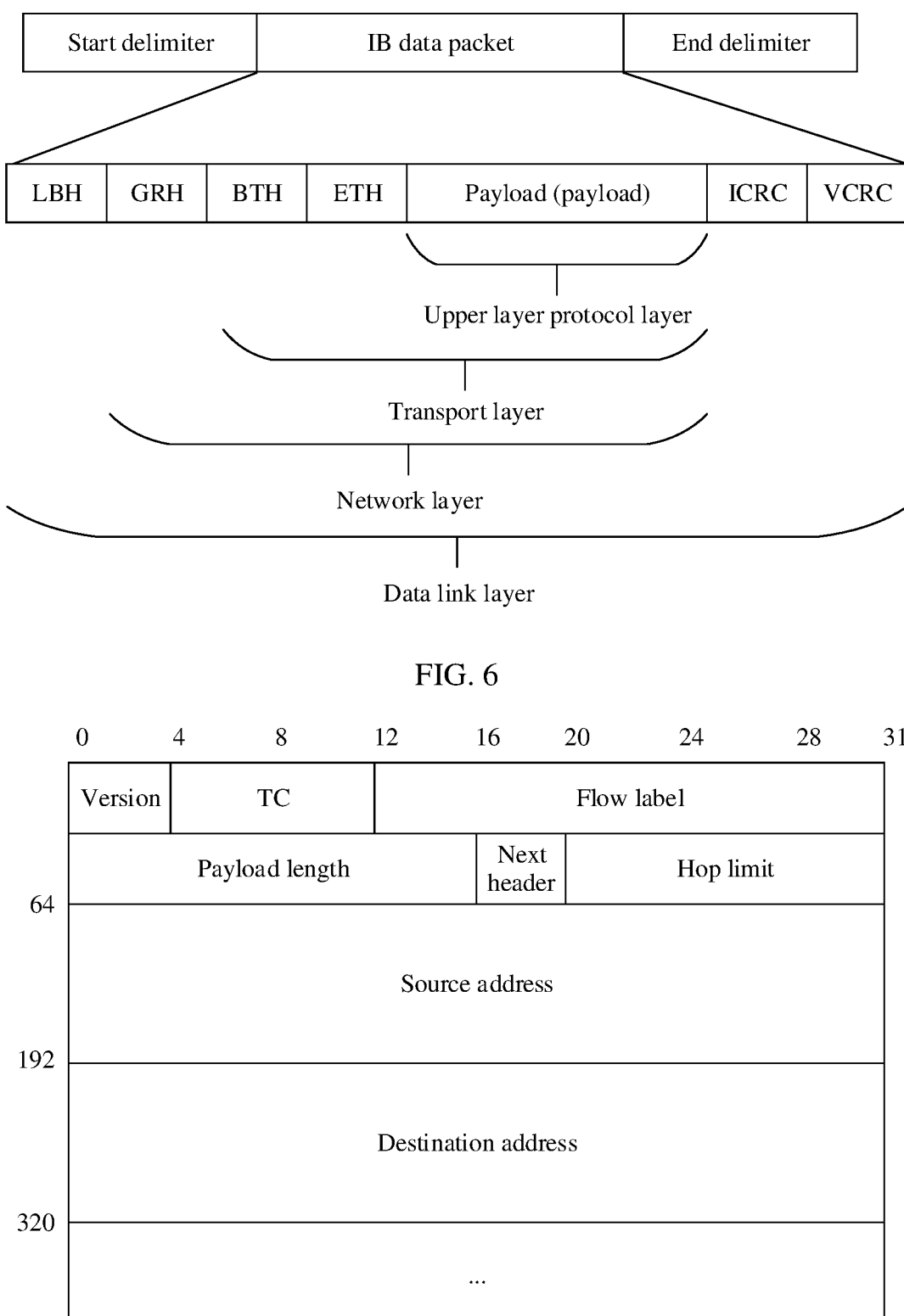
FIG. 6 is an example schematic diagram of a packet header format used for an IB data packet according to an embodiment of this application.
FIG. 7 is an example schematic diagram of an LRH structure according to an embodiment of this application.

Similar to an IP network, an IB network is also based on a protocol at a loose modular layer defined in a seven-layer OSI model, covering L1 to L4. An upper layer can be divided based on L5 to L7 in OSI or simplified as an upper layer protocol layer. Refer to FIG. 5. An IB network architecture includes a physical layer, a link layer, a network layer, and a transport layer. FIG. 6 is a schematic diagram of a packet header format used by an IB data packet. The IB data packet is located between a start delimiter and an end delimiter, including a packet header, payload, and check code.

Specifically, the packet header includes a local route header (LRH), a global routing header (GRH), a base transport header (BTH), and an extended transport header (ETH). The check code includes invariant cyclic redundancy check (ICRC) code and variant cyclic redundancy check (VCRC) code.

An L2 packet header uses an LRH structure, an L3 packet header uses a GRH structure, and an L4 packet header uses a BTH structure.

FIG. 7 is a schematic diagram of an LRH structure. A virtual name (VL) occupies 4 bits and is used to identify a virtual channel used by a data packet. A link version (LVer) occupies 4 bits and is used to identify a link layer protocol of a data packet. A service level (SL) occupies 4 bits and is used to identify a service level required by a data packet in a subnet. Reserved (REV) occupies 2 bits. A link next header (LNH) occupies 2 bits and is used to identify a data packet header that follows an LR and information. A destination address (destination local ID, DLID) occupies 16 bits and is used to identify a destination port and a path in a local subnet. Reserved (REV) occupies 5 bits. A packet length (PktLen) occupies four bytes and is used to identify a length of a data packet, including all areas from a first byte of LRH information to a last byte before a CRC check character. A source address (source local ID) occupies 16 bits and is used to determine a source port in the local subnet.

A GRH may be 40 bytes. For example, an IPv6 header format may be used. The transport layer L4 includes a BTH, and may further include an ETH. In an IB network, a function of the transport layer transmits a data packet to a specified queue pair (QP), and indicates the QP to process the data packet. The QP at a receiving end reassembles data into a specified data buffer. The BTH specifies a destination QP, an operation type, a data packet sequence number, and partition information.

In the IB network, at a transmitting end, after a data packet encapsulated at an upper layer protocol layer arrives at the transport layer, an ETH and a BTH are encapsulated at the transport layer, and then a GRH is encapsulated at the network layer, and then an LRH is encapsulated at the link layer before the data packet reaches the physical layer. After being processed at the physical layer, the data packet is sent. After receiving the data packet, the receiving end parses and strips the data packet layer by layer, and finally sends user data to an upper layer.

On the one hand, transmission and reception of a network device basically comply with the seven-layer OSI model. A packet format is designed according to a layered design concept and idea, and a packet encapsulation and decapsulation process is defined. When the network device performs data packet encapsulation and decapsulation, a data packet is assembled by invoking and adding packet headers at layers layer by layer from top to bottom, and the data packet is received and parsed by stripping the packet headers at layers layer by layer. Each layer is mandatory, and the layers are processed according to a fixed sequence. This cannot meet current flexible network protocol requirements, resulting in a waste of resources.

On the other hand, in packet headers at layers in a network, each field has a fixed length, and a combination of field segments is also fixed. However, a network scale, network traffic characteristics, and special network requirements are not considered. Whether such a long field segment is required and whether so many field segments are required are not considered, resulting in a waste of resources.

Based on this, embodiments of this application provide a data processing method and apparatus, to flexibly encapsulate a packet header at a protocol layer, thereby reducing a waste of resources.

The following describes in detail solutions provided in this application with reference to specific embodiments.

Embodiments of this application is applicable to a network system including at least two network devices. The network device may be a host server, a personal computer, or the like configured to generate or receive a data packet. Alternatively, the network device may be a forwarding device for forwarding a data packet, for example, a router, a switch, or a forwarder.

Figures 8, 9:
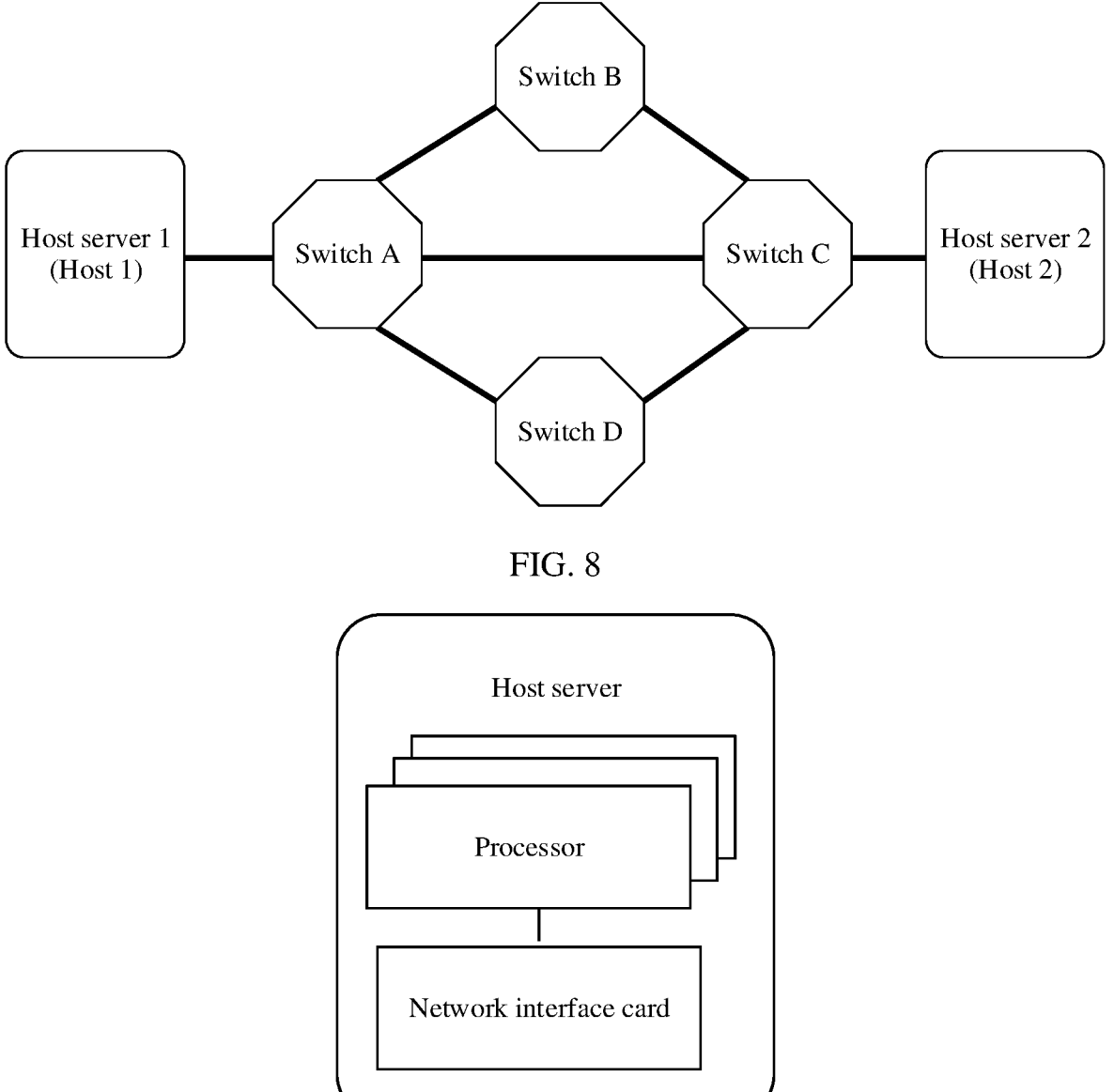
FIG. 8 is an example schematic diagram of a possible architecture of a network system according to an embodiment of this application.
FIG. 9 is an example schematic diagram of a structure of a host according to an embodiment of this application.

In an example, FIG. 8 is a schematic diagram of a possible architecture of a network system. The network system includes at least two host servers. A communication connection is set up between the host servers. As an example, the host servers may be interconnected over a switch network and/or a router network. In FIG. 8, two host servers are used as an example. The two host servers communicate with each other through a switch A to a switch D. It should be understood that FIG. 8 is merely an example, and does not limit a quantity of host servers and a quantity of switches included in the network system. In subsequent description, the host server may be referred to as a host for short.

The host may also be a terminal device. The terminal device may be user equipment (UE), a mobile station (MS), or a subscriber unit (SU). Specifically, the terminal device may be but is not limited to a mobile phone, a tablet computer, a laptop computer, a wearable device (such as a smartwatch, a smart band, a smart helmet, or smart glasses), or other communication apparatuses that have a wireless access capability, for example, various internet of things devices, including various smart home devices (such as a smart meter and a smart home appliance), an intelligent vehicle, and the like.

Refer to FIG. 9. In an example, a host server may include a network interface card and one or more processors. The processor may be a general-purpose central processing unit (CPU), a microprocessor, an application-specific integrated circuit (ASIC), one or more integrated circuits, or a graphics processing unit (GPU), configured to execute a related program, to implement the technical solutions provided in embodiments of this application. The network interface card may be referred to as a network interface card of the processing unit. The network interface card may also be referred to as a network interface card, a network adapter, a physical network interface, and the like. The one or more processors may implement encapsulation of a packet header at any protocol layer from fifth to seventh protocol layers. The network interface card may be configured to implement encapsulation of a packet header at any protocol layer from first to fourth protocol layers. In an example, the one or more processors may be configured to deploy application software of a user, and configured to encapsulate or decapsulate packet headers at the fifth to seventh protocol layers, and perform corresponding processing at each protocol layer. The network interface card may be configured to provide network services at the first to fourth protocol layers for the application software of the user, and configured to encapsulate or decapsulate packet headers at the first to fourth protocol layers, and perform corresponding processing at each protocol layer.

A switch may work at a data link layer, and is mainly configured to implement encapsulation or decapsulation at the data link layer, so as to forward a data packet generated by a host server. The switch may alternatively work at a network layer, and is mainly configured to implement encapsulation or decapsulation at the data link layer and the network layer, so as to forward a data packet generated by a host server. A router usually works at the network layer, mainly implements encapsulation or decapsulation at the network layer and the data link layer, to forward a data packet from a host server.

To reduce a waste of resources, an embodiment of this application provides the following solutions as an example:

In a first possible implementation, the network device adds a first field to a packet header at an encapsulated protocol layer. The first field indicates which protocol layer is an inner protocol layer of a current protocol layer. In this embodiment of this application, the inner layer may also be described as an upper layer. An outer layer may also be described as a lower layer. When data encapsulation or decapsulation is performed based on the first field, an unnecessary protocol layer can be skipped based on a requirement, and a packet header at the skipped protocol layer is not encapsulated and decapsulated, thereby reducing a waste of resources.

It should be noted that, in this embodiment of this application, a field in the packet header may be referred to as a field or a field segment. This is not specifically limited in this embodiment of this application.

Alternatively, the first field may be named as a next layer protocol (NLP) field. Another name may be used. This is not specifically limited in this embodiment of this application. In the following description, the field is referred to as an NLP field as an example.

In a second possible implementation, the network device adds a second field to a packet header at an encapsulated protocol layer. The second field indicates a packet header format used at the current protocol layer. Different packet header formats include different quantities of fields, different packet header formats include different quantities of bits occupied by same fields, or different packet header formats include different quantities of fields and different quantities of bits occupied by one or more fields. For a protocol layer, a required packet header format may be used based on the second field for encapsulation or decapsulation. For example, when a field segment is not required, a packet header format that does not include the field segment is selected. For another example, a length of a field segment may be reduced, and a packet header format in which a quantity of bits of the field segment is reduced may be used. This reduces a waste of resources.

Alternatively, the second field may be named as a configuration (CFG) field. Currently, another name may be used. This is not specifically limited in this embodiment of this application. In the following description, the field is referred to as a CFG field as an example.

It should be noted that, in some embodiments, the first possible implementation may be separately implemented. In some other embodiments, the second possible implementation may be separately implemented. In some other embodiments, the first possible implementation and the second possible implementation may be jointly implemented.

First, an example in which the first possible implementation and the second possible implementation are jointly implemented is used for detailed description.

A packet header at each protocol layer includes an NLP field and a CFG field. The NLP field indicates which protocol layer is an upper layer (inner layer) protocol layer of a current protocol layer, or is described as a protocol type at the upper layer protocol layer indicated by the NLP field. The CFG field indicates the packet header format at the current protocol layer. Different values of the CFG field indicate different packet header formats used at the protocol layer. For example, an outer layer of a first protocol layer is a second protocol layer. A value of an NLP field in a packet header at the second protocol layer indicates that an inner layer of the second protocol layer is the first protocol layer. A value of a CFG field in the packet header at the second protocol layer indicates a packet header format at the second protocol layer. The first protocol layer and the second protocol layer may be two adjacent layers in seven layers included in an OSI model. Alternatively, the first protocol layer and the second protocol layer may be two non-adjacent layers in seven layers included in an OSI model. Alternatively, the first protocol layer and the second protocol layer are a same layer in seven layers included in an OSI model, for example, to a network layer. Packet headers at a plurality of protocol layers are encapsulated in the network layer.

In an example, the NLP field and the CFG field may occupy a fixed location in a packet header at a protocol layer. The NLP field and the CFG field may occupy a same bit width in packet headers at different protocol layers. For example, the NLP field and the CFG field occupy a fixed quantity of bits at a beginning of a packet header at each protocol layer. Alternatively, the NLP field and the CFG field occupy a fixed quantity of bits at an end at each protocol layer. A location sequence of the NLP field and the CFP field is not limited in this embodiment of this application. The NLP field may be before the CFG field, or the NLP field may be after the CFG field. Alternatively, the NLP field occupies a fixed quantity of bits at the beginning at each protocol layer, and the CFG field occupies a fixed quantity of bits at the end at each protocol layer. Alternatively, the NLP field occupies a fixed quantity of last bits at each protocol layer, and the CFG field occupies a fixed quantity of beginning bits at each protocol layer.

Figure 10:
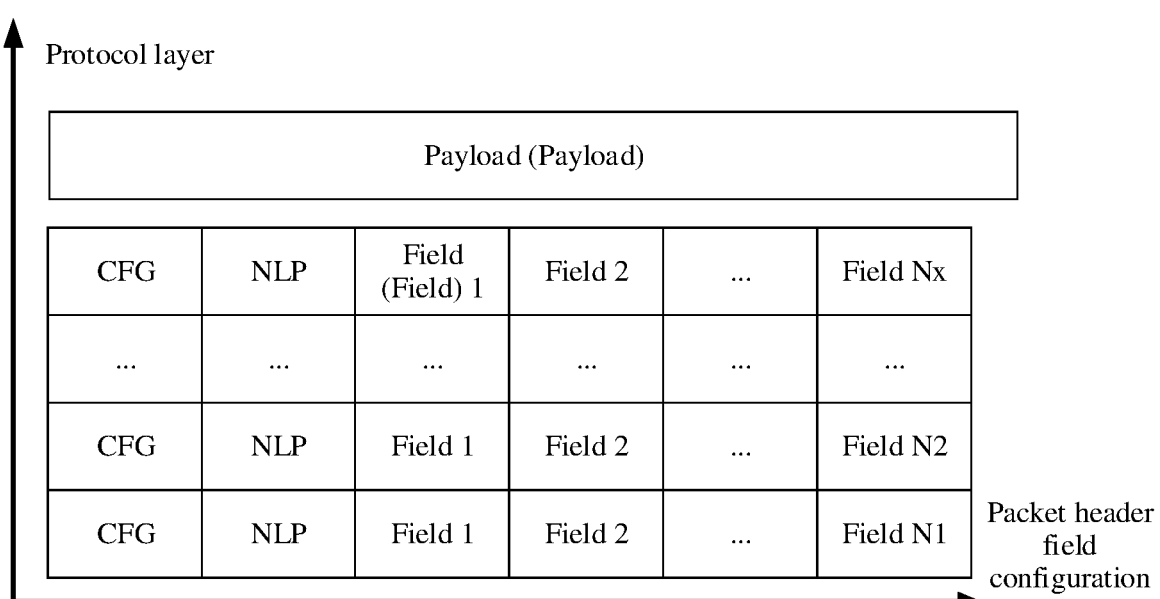
FIG. 10 is an example schematic diagram of a packet header format at a protocol layer according to an embodiment of this application.

Refer to FIG. 10. For example, the NLP field and the CFG field occupy a fixed quantity of bits at the beginning of a packet header at each protocol layer. In FIG. 10, an example in which the CFG field is before the NLP field is used. Therefore, the receiving end can parse the NLP field and the CFG field at each protocol layer at the fixed location, to learn of a packet header format at a current protocol layer and a protocol type at an inner protocol layer of the current protocol layer, parse the current protocol layer, and determine which protocol layer is to be further parsed.

In some embodiments, at a same protocol layer, different values of the NLP field indicate different protocol types. In an example, different protocol layers may be configured in a unified manner. To be specific, at different protocol layers, a same value of NLP fields indicates a same protocol type. In another example, meanings represented by values of NLP fields at different protocol layers may be defined based on requirements of layers. At different protocol layers, a same value of NLP fields may indicate different protocol types. For example, in the first protocol layer and the second protocol layer, if values of NLP fields are both 1, indicated protocol types may be different.

In some other embodiments, at a same protocol layer, different values of the CFG field indicate different packet header formats. In an example, different protocol layers may be configured in a unified manner. To be specific, at different protocol layers, a same value of CFG fields indicates a same packet header format. In another example, meanings represented by values of CFG fields at different protocol layers may be defined based on requirements of layers. At different protocol layers, a same value of CFG fields may indicate different packet header formats. For example, in the first protocol layer and the second protocol layer, if values of CFG fields are both 1, indicated packet header formats may be different.

Figure 11:
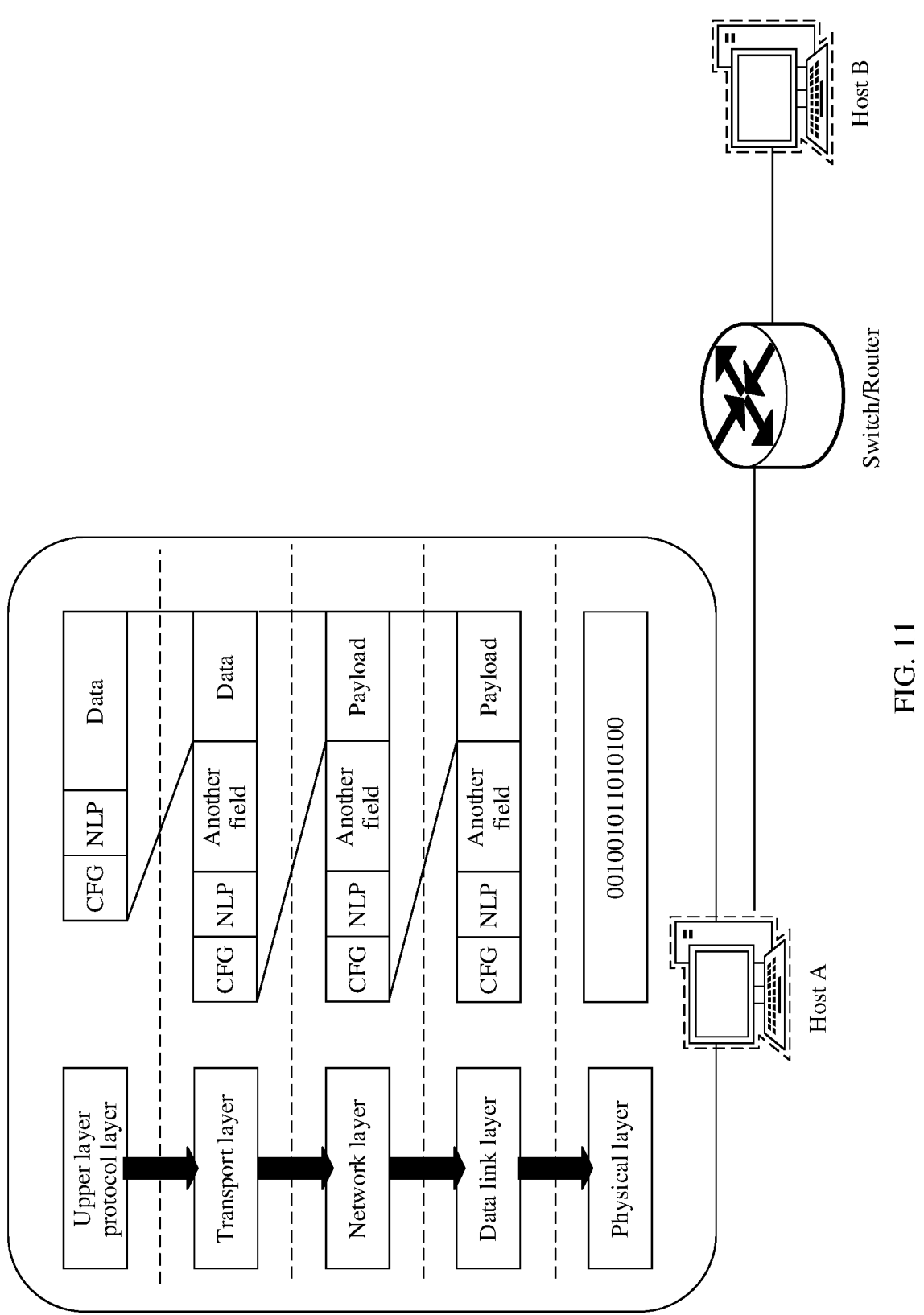
FIG. 11 is an example schematic flowchart of a data processing method at a transmitting end according to an embodiment of this application.

The following describes a process of a data processing method at a transmitting end according to an embodiment of this application with reference to FIG. 11. FIG. 11 is a schematic diagram of a complete multi-layer invocation and encapsulation process. According to the solutions provided in this embodiment of this application, cross-layer transmission may be performed based on a service requirement in a network. For example, cross-layer transmission is performed across a network layer, without encapsulating a packet header at a network layer, to reduce a waste of resources.

When a host server at a transmitting end encapsulates a packet, from top to bottom, each protocol layer adds values of an NLP field and a CFG field and a value of another field in a packet header, and a data packet to which the packet header is added is sent to a lower protocol layer. The lower protocol layer determines a protocol type at an upper protocol layer, and adds values of an NLP field and a CFG field and a value of another field in a packet header. The data packet encapsulated by adding a packet header layer by layer is sent to a network. The host server at the transmitting end encapsulates user data in a data packet. A packet header of the data packet includes packet headers at N protocol layers. The host server at the transmitting end sends the data packet to a host server at a receiving end. For example, the N protocol layers include at least a first protocol layer and a second protocol layer. An inner layer of the second protocol layer is the first protocol layer. A packet header at the second protocol layer includes an NLP field and a CFG field. A value of the NLP field at the second protocol layer indicates that the inner layer of the second protocol layer is the first protocol layer. A value of the CFG field at the second protocol layer indicates a packet header format at the second protocol layer. Specifically, a data packet in which the packet header at the first protocol layer is encapsulated is referred to as a first data packet, and a data packet in which the packet header at the second protocol layer is encapsulated is referred to as a second data packet. The host server at the transmitting end obtains the first data packet in which the packet header at the first protocol layer is encapsulated, determines that an outer layer of the first protocol layer is the second protocol layer, and then encapsulates the packet header at the second protocol layer in the first data packet to obtain the second data packet. The packet header of the second protocol layer includes the NLP field and the CFG field. The value of the NLP field in the packet header at the second protocol layer indicates that the inner layer of the second protocol layer is the first protocol layer. The value of the CFG field in the packet header at the second protocol layer indicates the packet header format at the second protocol layer.

In a possible implementation, a correspondence between an NLP value and a protocol layer is configured in the host server.

In an example, a correspondence between a value of an NLP field and a protocol layer may be configured in a global manner. For example, protocol layers may use such configuration information to determine the NLP value corresponding to the protocol layer. For ease of description, configuration information in a global configuration mode is referred to as first configuration information. The first configuration information includes a correspondence between different values of NLP fields and different protocol layers. Specifically, the host server at the transmitting end determines the value of the NLP field in the packet header at the second protocol layer based on the first configuration information.

For example, Table 1 shows an example of a correspondence between a possible value of an NLP field and a protocol layer. Table 1 is merely used as an example. Table 1 describes only an example of a correspondence between several values of NLP fields and several protocol layers. It should be understood that Table 1 does not constitute a specific limitation on a quantity of bits occupied by the NLP field.

TABLE 1

| Protocol layer | Value of the NLP field |
| --- | --- |
| IP | 00000 |
| GRE | 00001 |
| TCP | 00010 |
| UDP | 00011 |
| BFD | 00100 |
| SCTP | 00101 |

For example, the first protocol layer is a TCP layer, and the second protocol layer is an IP layer. A network interface card of the host server obtains a TCP data packet encapsulated with a TCP protocol packet header from a transport layer, and determines that an outer layer of the TCP layer is the IP layer. Table 1 is used as an example. It is determined that a value of an NLP field in a packet header at the IP layer is 00010. Further, the TCP data packet is used as data. The packet header is encapsulated based on the data. The value 00010 of the NLP field in the packet header indicates that an upper protocol layer of the IP layer is the TCP layer.

In another example, at different protocol layers, correspondences between values of NLP fields and protocol layers may be different. For example, the second protocol layer corresponds to second configuration information, and the second configuration information includes a correspondence between different values of NLP fields and different protocol layers at the second protocol layer. Different protocol layers correspond to different configuration information. Specifically, the host server at the transmitting end determines the value of the NLP field in the packet header at the second protocol layer based on the second configuration information corresponding to the second protocol layer.

For example, Table 2 shows an example of a correspondence between a possible value of an NLP field at a different protocol layer and an indicated upper protocol layer. Table 2 is merely used as an example. Table 2 describes only an example of a correspondence between several values of NLP fields and several protocol layers. It should be understood that Table 2 does not constitute a specific limitation on a quantity of bits occupied by the NLP field.

TABLE 2

| Current protocol layer | Upper protocol layer | Value of the NLP field |
| --- | --- | --- |
| IP | Session layer | 000 |
| | TCP | 001 |
| | UDP | 010 |
| | SCTP | 011 |
| TCP | GTP | 000 |
| | GTP-U | 001 |

For example, the first protocol layer is a TCP layer, and the second protocol layer is an IP layer. A network interface card of the host server obtains a TCP data packet encapsulated with a TCP protocol packet header from a transport layer, and determines that an outer layer of the TCP layer is the IP layer. Table 2 is used as an example. It is determined that a current protocol layer is the IP layer, and an upper protocol layer of the IP layer is the TCP layer. It is determined based on Table 2 that a value of an NLP field in a packet header at the IP layer is 001. Further, the TCP data packet is used as data. The packet header is encapsulated based on the data. The value 001 of the NLP field in the packet header indicates that the upper protocol layer of the IP layer is the TCP layer.

In some embodiments, which protocol layers need to be encapsulated between the transmitting end and the receiving end and an adjacency relationship between the protocol layers may be preconfigured in the host server at the transmitting end and the host server at the receiving end. Third configuration information is configured at the transmitting end. The third configuration information indicates a protocol layer for encapsulating a data packet and an adjacency relationship between different protocol layers. The transmitting end may determine, based on the third configuration information, that the outer layer of the first protocol layer is the second protocol layer.

For example, the third configuration information may be sent by a network management device to the host server at the transmitting end and the host server at the receiving end.

In some other embodiments, which protocol layers need to be encapsulated between the transmitting end and the receiving end and an adjacency relationship between the protocol layers may also be determined through negotiation between the transmitting end and the receiving end. The transmitting end and the receiving end negotiate protocol layer information. The protocol layer information indicates a protocol layer used to encapsulate a data packet and an adjacency relationship between different protocol layers. In this way, the transmitting end may determine, based on the protocol layer information, that the outer layer of the first protocol layer is the second protocol layer. The negotiation manner is described in detail subsequently.

In a possible implementation, a correspondence between a CFG value and a packet header format is configured in both the host server at the transmitting end and the host server at the receiving end.

In an example, a correspondence between a value of a CFG field and a packet header format may be configured in a global manner. For example, protocol layers may use such configuration information to determine the CFG value corresponding to the packet header format. For ease of description, configuration information in a global configuration mode is referred to as fourth configuration information. The fourth configuration information includes a correspondence between different values of CFG fields and different packet header formats.

For example, Table 3 shows an example of a correspondence between a possible value of a CFG field and a packet header format. Table 3 is merely used as an example. Table 3 describes only an example of a correspondence between several values of CFG fields and several packet header formats. It should be understood that Table 3 does not constitute a specific limitation on a quantity of bits occupied by the CFG field.

TABLE 3

| Value of the NLP field | Packet header format | Remarks |
|---|---|---|
| 00000 | Format 1 | A field 1 occupies X1 bits, a field 2 occupies X2 bits, a field 3 occupies X3 bits, . . . |
| 00001 | Format 2 | A field 1 occupies Y1 bits, a field 3 occupies X3 bits, . . . |
| 00010 | Format 3 | A field 11 occupies Z1 bits, a field 12 occupies Z2 bits, . . . |
| 00011 | Format 4 | A field 21 occupies k1 bits, a field 22 occupies k2 bits, . . . |
| 00100 | Format 5 | A field 31 occupies k31 bits, a field 32 occupies k32 bits, . . . |
| Value of the NLP field | Packet header format | Remarks |
| . . . | . . . | . . . |

In another example, at different protocol layers, correspondences between values of CFG fields and packet header formats may be different. For example, the second protocol layer corresponds to fifth configuration information, and the fifth configuration information includes a correspondence between different values of CFG fields and different packet header formats at the second protocol layer. Different protocol layers correspond to different configuration information.

For example, Table 4 shows an example of a correspondence between a possible value of a CFG field at a different protocol layer and an indicated packet header format. Table 4 is merely used as an example. Table 4 describes only an example of a correspondence between several values of CFG fields and several packet header formats. It should be understood that Table 4 does not constitute a specific limitation on a quantity of bits occupied by the CFG field.

layer may be preconfigured on the host server at the transmitting end based on an application scenario in which the transmitting end and the receiving end are located. Indication information is configured at the transmitting end, and the indication information indicates a packet header format at a protocol layer. The transmitting end may determine a packet header format at each protocol layer based on the indication information.

For example, the indication information may be sent by a network management device to the host server at the transmitting end.

In some other embodiments, when the data packet is transmitted between the transmitting end and the receiving end, a packet header format used at each protocol layer may be determined through negotiation between the transmitting end and the receiving end. The transmitting end and the receiving end negotiate format information. The format

TABLE 4

| Current protocol layer | Value of the NLP field | Packet header format | Remarks |
|---|---|---|---|
| Protocol A | 00 | Format 1 | A field 1 occupies X1 bits, a field 2 occupies X2 bits, . . . |
|  | 01 | Format 2 | A field 1 occupies Y1 bits, a field 3 occupies X3 bits, . . . |
| Protocol B | 00 | Format 3 | A field 11 occupies Z1 bits, a field 12 occupies Z2 bits, . . . |
|  | . . . | . . . | . . . |
| Protocol layer C | 00 | Format 4 | A field 21 occupies k1 bits, a field 22 occupies k2 bits, . . . |
|  | . . . | . . . | . . . |
| Protocol layer D | 00 | Format 5 | A field 31 occupies k31 bits, a field 32 occupies k32 bits, . . . |
|  | . . . | . . . | . . . |

For example, the first protocol layer is a TCP layer, and the second protocol layer is an IP layer. A network interface card of the host server obtains a TCP data packet encapsulated with a TCP protocol packet header from a transport layer, and determines that an outer layer of the TCP layer is the IP layer. Table 2 is used as an example. It is determined that a current protocol layer is the IP layer, and an upper protocol layer of the IP layer is the TCP layer. It is determined based on Table 2 that a value of an NLP field in a packet header at the IP layer is 001. Further, the TCP data packet is used as data. The packet header is encapsulated based on the data. The value 001 of the NLP field in the packet header indicates that the upper protocol layer of the IP layer is the TCP layer.

In some embodiments, a packet header format that needs to be used at each protocol layer may be preconfigured on the host server at the transmitting end. For example, the packet header format that needs to be used at each protocol information indicates a packet header format used at a protocol layer used to encapsulate a data packet. In this way, the transmitting end may determine, based on the format information, a packet header format used at each protocol layer.

The following describes a manner of negotiating, between the transmitting end and the receiving end, protocol layers for encapsulating a data packet, an adjacency relationship between the protocol layers, and a packet header format used at each protocol layer.

In a first possible implementation, an overall packaging negotiation manner is used between the transmitting end and the receiving end. A data packet format used during negotiation between the transmitting end and the receiving end may be encapsulated by using a complete layer and a default packet header format at each layer that are recognized by both parties.

A1: The transmitting end sends capability information, location information, and requirement information of the transmitting end to the receiving end, so that the receiving end feeds back capability information, location information, and requirement information of the receiving end to the transmitting end.

The capability information may include one or more of the following:

information such as a bandwidth of a network interface card port, a capability of the network interface card to reassemble out-of-order packets, a quantity of priority queues supported by the network interface card, a processing capability of a processor, and an application type.

The location information may include one or more of the following:

physical location information such as country/city, an equipment room number, a cabinet number, a subrack number, and a board number, or information such as an IP address.

The requirement information may include one or more of the following:

information such as whether a to-be-sent data includes a small-traffic short packet (a latency-sensitive mice flow) or a large-traffic long packet (a bandwidth-sensitive elephant flow), and whether a dual-layer network header for network interface card virtualization is required.

The elephant flow is a flow of a large amount of data that is continuously transmitted through a network link. The mice flow is a flow of a small amount of data that is transmitted in a short time through a network link.

A2: The transmitting end and the receiving end separately select a layer combination and determine a packet header format at a protocol layer based on one or more of the capability information, the location information, or the requirement information of the two parties and according to a set determining rule (the rule needs to be preconfigured or fixed in a negotiation program). Further, the selected layer combination and the determined packet header format at the protocol layer are locally stored, to guide subsequent encapsulation and decapsulation of a data packet. The layer combination includes a protocol layer for encapsulating a data packet and an adjacency relationship between protocol layers.

In an example, a protocol layer for a network layer includes three packet header formats: a simplified protocol layer packet header format, a standard protocol layer packet header format, and a large-scale protocol layer packet header format at the network layer. In another example, a protocol layer for a transport layer includes two packet header formats: a simplified protocol layer packet header format and a standard protocol layer packet header format at the transport layer. For example, a quantity of fields in the simplified protocol layer packet header format is less than a quantity of fields in the standard protocol layer packet header format. The quantity of fields in the standard protocol layer packet header format is less than a quantity of fields in the large-scale protocol layer packet header format. For another example, for one or more fields in a packet header at a protocol layer, a bit width of the field in the simplified protocol layer packet header format is less than a bit width of the field in the standard protocol layer packet header format. The bit width of the field in the standard protocol layer packet header format is less than a bit width of the field in the large-scale protocol layer packet header format. It should be noted that there may be one, two, or more types of packet header formats configured for some protocol layers. This is not specifically limited in this embodiment of this application. With reference to the foregoing examples, the determining rule may meet one or more of the following:

(1) It is determined, based on the location information, that the transmitting end and the receiving end are located in one cabinet, the transport layer is omitted, and the simplified network layer format is used. When data is transmitted between different network devices in a cabinet, due to high reliability and a small network scale, fewer fields at the network layer and a smaller bit width can improve transmission efficiency and resource utilization.

(2) It is determined, based on the location information, that the transmitting end and the receiving end are located in different cabinets in a same equipment room, the simplified protocol layer packet header format at the transport layer is used, and the standard protocol layer packet header format at the network layer is used.

(3) It is determined, based on the location information, that the transmitting end and the receiving end are located in equipment rooms in different cities, the standard protocol layer packet header format at the transport layer is used, and the large-scale protocol layer packet header format at the network layer is used. When data is transmitted between two network devices in equipment rooms in different cities, due to long transmission distance and a large network scale, packet loss may easily occur, more fields at the network layer and a greater bit width can reduce a packet loss rate.

(4) It is determined, based on information such as a dual-layer network header for network interface card virtualization, that the network layer includes at least two protocol layers.

(5) A proper packet header format at the transport layer and a proper packet header format at the network layer (for example, including fields such as a priority queue field) are selected based on capabilities of reassembling out-of-order packets received by network interface cards at the transmitting end and the receiving end, a quantity of priority queues supported by the network interface card, a traffic feature, or the like.

For example, the network interface card at the receiving end does not have the capability of reassembling received out-of-order packets, fields such as a sequence number are needed in the packet header format at the transport layer for the receiving end to reassemble data packets based on the sequence number. Therefore, a protocol layer packet header format in which the transport layer includes a sequence number field can be used for data packet transmission between the transmitting end and the receiving end. For another example, the network interface card at the receiving end has a capability has the capability of reassembling received out-of-order packets, fields such as a sequence number are no longer needed in the packet header format at the transport layer. Therefore, a protocol layer packet header format in which the transport layer does not include a sequence number field can be used for data packet transmission between the transmitting end and the receiving end.

For example, the network interface card at the receiving end supports four priority queues, a bit width of a virtual lane (virtual lane) field in a sent packet header format at the network layer may be 2 bits. Therefore, a protocol layer packet header format in which a bit width of the virtual lane field at the transport layer is 2 bits can be used for data packet transmission between the transmitting end and the receiving end. For another example, the network interface card at the receiving end supports 16 priority queues, a bit width of a virtual lane (virtual lane) field in a sent packet header format at the network layer may be 4 bits. Therefore, a protocol layer packet header format in which a bit width of the virtual lane field at the transport layer is 4 bits can be used for data packet transmission between the transmitting end and the receiving end.

(6) A proper packet header format at the upper layer protocol layer is selected based on information such as processing capabilities of processors at the transmitting end and the receiving end, and a type of an application program.

In a second possible implementation, an overall packaging negotiation manner is used between the transmitting end and the receiving end based on latency information. A data packet used during negotiation between the transmitting end and the receiving end may be encapsulated by using a complete layer and a default format at each layer that are recognized by both parties.

B1: The transmitting end sends capability information, location information, and requirement information of the transmitting end to the receiving end, so that the receiving end feeds back capability information, location information, and requirement information of the receiving end to the transmitting end, and the receiving end indicates the transmitting end to return acknowledgment information.

B2: The transmitting end records a latency T1 of a round trip for sending a packet, that is, a time difference between time of receiving the capability information, the location information, and the requirement information fed back by the receiving end and time of sending the capability information, the location information, and the requirement information of the transmitting end.

B3: The receiving end records a latency T2 of a round trip for sending a packet, that is, a time difference between time for the transmitting end to return the acknowledgment information and time of feeding back the capability information, the location information, and the requirement information of the receiving end to the transmitting end.

B4: The transmitting end and the receiving end separately select a layer combination and determine a packet header format at a protocol layer based on one or more of the capability information, the location information, or the requirement information of the two parties and according to a set determining rule (the rule needs to be preconfigured or fixed in a negotiation program). Further, the selected layer combination and the determined packet header format at the protocol layer are locally stored, to guide subsequent encapsulation and decapsulation of a data packet. The layer combination includes a protocol layer for encapsulating a data packet and an adjacency relationship between protocol layers.

In an example, the determining rule may meet one or more of the following:

(1) It is determined, based on the location information, that the transmitting end and the receiving end are located in one cabinet, the transport layer is omitted, and the simplified network layer format is used.

(2) It is determined, based on the location information, that the transmitting end and the receiving end are located in different cabinets in a same equipment room, the simplified packet header format at the transport layer is used, and the standard format at the network layer is used.

(3) It is determined, based on the location information, that the transmitting end and the receiving end are located in equipment rooms in different cities, the standard packet header format at the transport layer is used, and the large-scale format at the network layer is used.

(4) It is determined, based on information such as a dual-layer network header for network interface card virtualization, that the network layer includes at least two protocol layers.

(5) A proper packet header format at the transport layer and a proper packet header format at the network layer (for example, fields such as a priority queue field) are selected based on one or more of a capability of reassembling out-of-order packets received by the network interface card at the peer end, a quantity of priority queues supported by the network interface card, a traffic feature, latency information, a quantity of hops of an intermediate switch, or the like. For example, if a latency is small, or there are fewer hops, the simplified packet header at the network layer and/or the simplified packet header at the transport layer can be selected. If a latency is large or there are more hops, the standard packet header at the network layer and/or the standard packet header at the transport layer can be selected.

(6) A proper packet header format at the upper layer protocol layer is selected based on information such as processing capabilities of processors at the transmitting end and the receiving end, and a type of an application program.

In a third possible implementation, a specific packet header format at a protocol layer may be further negotiated based on the first possible implementation or the second possible implementation is used between the transmitting end and the receiving end. The transmitting end and the receiving end exchange information concerned at the protocol layer, for example, a memory size used by the peer end. The transmitting end and the receiving end may exchange memory sizes of the two parties, and negotiate the packet header format is performed based on the exchanged information.

In a fourth possible implementation, the transmitting end and the receiving end may perform negotiation in a layered manner. Whether a protocol layer needs to be encapsulated and a packet header format used by the layer is negotiated between the protocol layers at the transmitting end and the receiving end.

Negotiation between the first protocol layer at the transmitting end and the first protocol layer at the receiving end is used as an example.

C1: The transmitting end sends concerned information at the first protocol layer at the transmitting end to the receiving end, and the receiving end feeds back concerned information at the first protocol layer at the receiving end to the transmitting end.

The concerned information at the first protocol layer may include one or more of the following: capacity information, requirement information, or location information.

The capability information may include one or more of the following:

information such as a bandwidth of a network interface card port, a capability of the network interface card to reassemble out-of-order packets, a quantity of priority queues supported by the network interface card, a processing capability of a processor, and an application type.

The location information may include one or more of the following:

physical location information such as country/city, an equipment room number, a cabinet number, a subrack number, and a board number, or information such as an IP address.

The requirement information may include one or more of the following:

information such as whether a to-be-sent data includes a small-traffic short packet (a latency-sensitive mice flow) or a large-traffic long packet (a bandwidth-sensitive elephant flow), and whether a dual-layer network header for network interface card virtualization is required.

C2: The transmitting end and the receiving end determine, based on the concerned information at the first protocol layers of the two parties, whether the first protocol layer and a packet header format at the first protocol layer are needed.

In an example, the first protocol layer is a transport layer. For example, it is determined, based on the location information, that the transmitting end and the receiving end are located in one cabinet, and the transport layer is omitted. For example, it is determined, based on the location information, that the transmitting end and the receiving end are located in different cabinets in a same equipment room, a simplified packet header format at the transport layer is used. For example, it is determined, based on the location information, that the transmitting end and the receiving end are located in equipment rooms in different cities, a standard packet header format at the transport layer is used. For example, a proper packet header format at the transport layer (for example, a priority queue field need to be included) is selected based on a capability of reassembling out-of-order packets received by the network interface card at the peer end, a quantity of priority queues supported by the network interface card, a traffic feature, or the like. For another example, a proper packet header format at the transport layer is selected based on latency information or a quantity of hops of an intermediate switch. For example, the simplified packet header format at the transport layer is selected for a small latency or fewer hops, or the standard packet header format at the transport layer is selected for a large latency or more hops.

In another example, the first protocol layer is a network layer. For example, it is determined, based on the location information, that the transmitting end and the receiving end are located in one cabinet, a standard packet header format at the network layer is used. For example, it is determined, based on the location information, that the transmitting end and the receiving end are located in different cabinets in a same equipment room, the standard packet header format at the network layer is used. For example, it is determined, based on the location information, that the transmitting end and the receiving end are located in equipment rooms in different cities, a large-scale packet header format at the network layer is used. For example, a proper packet header format at the network layer (for example, a priority queue field need to be included) is selected based on a capability of reassembling out-of-order packets received by the network interface card at the peer end, a quantity of priority queues supported by the network interface card, a traffic feature, or the like. For another example, a proper packet header format at the network layer is selected based on latency information or a quantity of hops of an intermediate switch. For example, the simplified packet header format at the network layer is selected for a small latency or fewer hops, or the standard packet header format at the network layer is selected for a large latency or more hops. For another example, it is determined, based on information such as a dual-layer network header for network interface card virtualization, that the network layer includes at least two protocol layers.

In an example, the first protocol layer is an upper layer protocol layer. For example, a proper packet header format at the upper layer protocol layer is selected based on information such as processing capabilities of processors at the transmitting end and the receiving end, and a type of an application program.

Figure 12:
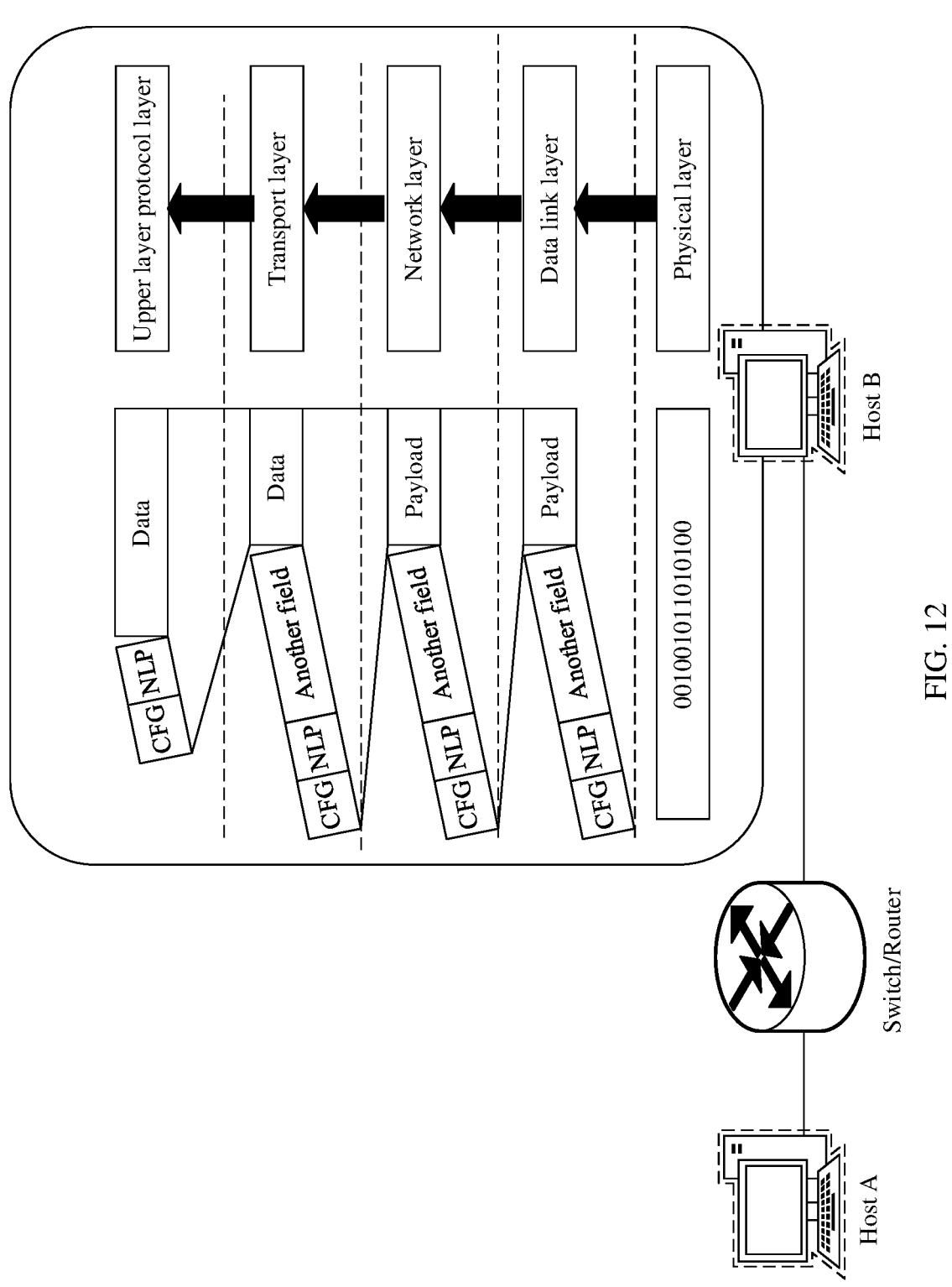
FIG. 12 is an example schematic flowchart of a data processing method at a receiving end according to an embodiment of this application.

FIG. 12 is a schematic flowchart of decapsulating a data packet by a host server serving as a receiving end. After receiving the data packet from a transmitting end, the host server at the receiving end performs decapsulation from bottom to top (or from an outer layer to an inner layer). After each layer is decapsulated, a packet header format at a current protocol layer is determined based on an indication of a CFG field at the current protocol layer, to perform decapsulation on a packet header at the current protocol layer (which may also be described as decapsulating the packet header at the current protocol layer). An upper protocol layer is determined based on an indication of an NLP field, to further decapsulate a packet header at the upper protocol layer. User data of the transmitting end is obtained through layer-by-layer decapsulation. The following uses decapsulation at a first protocol layer and a second protocol layer as an example. The host server at the receiving end receives the data packet. The user data from the transmitting end and packet headers at N protocol layers are encapsulated in the data packet. The N protocol layers include at least the first protocol layer and the second protocol layer. A packet header at the second protocol layer includes an NLP field and a CFG field. A packet header format at the second protocol layer is determined based on an indication of the CFG field in the packet header at the second protocol layer, to decapsulate the packet header at the second protocol layer. Then, the first protocol layer is determined based on an indication of the NLP field at the second protocol layer, to decapsulate a packet header at the first protocol layer.

In an example, first configuration information is configured in the host server at the receiving end. The first configuration information includes a correspondence between different values of NLP fields and different protocol layers. An example is shown in Table 1. Specifically, the host server at the receiving end determines, based on a value of the NLP field in the packet header at the second protocol layer and the first configuration information, that an inner layer of the second protocol layer is the first protocol layer, and then decapsulates the packet header at the first protocol layer.

In another example, second configuration information corresponding to the second protocol layer is configured in the host server at the receiving end. The second configuration information includes a correspondence between different values of NLP fields and different protocol layers at the second protocol layer. An example is shown in Table 2. The host server at the receiving end determines, based on a value of the NLP field in the packet header at the second protocol layer and the second configuration information corresponding to the second protocol layer, that an inner layer of the second protocol layer is the first protocol layer, and decapsulates the packet header at the first protocol layer.

In still another example, fourth configuration information is configured in the host server at the receiving end. The fourth configuration information includes a correspondence between different values of CFG fields and different packet header formats. An example is shown in Table 3. The host server at the receiving end determines the packet header format at the second protocol layer based on a value of the CFG field in the packet header at the second protocol layer and the fourth configuration information, and then decapsulates the packet header at the second protocol layer.

For yet another example, fifth configuration information corresponding to the second protocol layer is configured in the host server at the receiving end. The fifth configuration information includes a correspondence between different values of CFG fields and different packet header formats at the second protocol layer. An example is shown in Table 4. The host server at the receiving end determines the packet header format at the second protocol layer based on a value of the CFG field in the packet header at the second protocol layer and the fifth configuration information, and then decapsulates the packet header at the second protocol layer.

Figure 13:
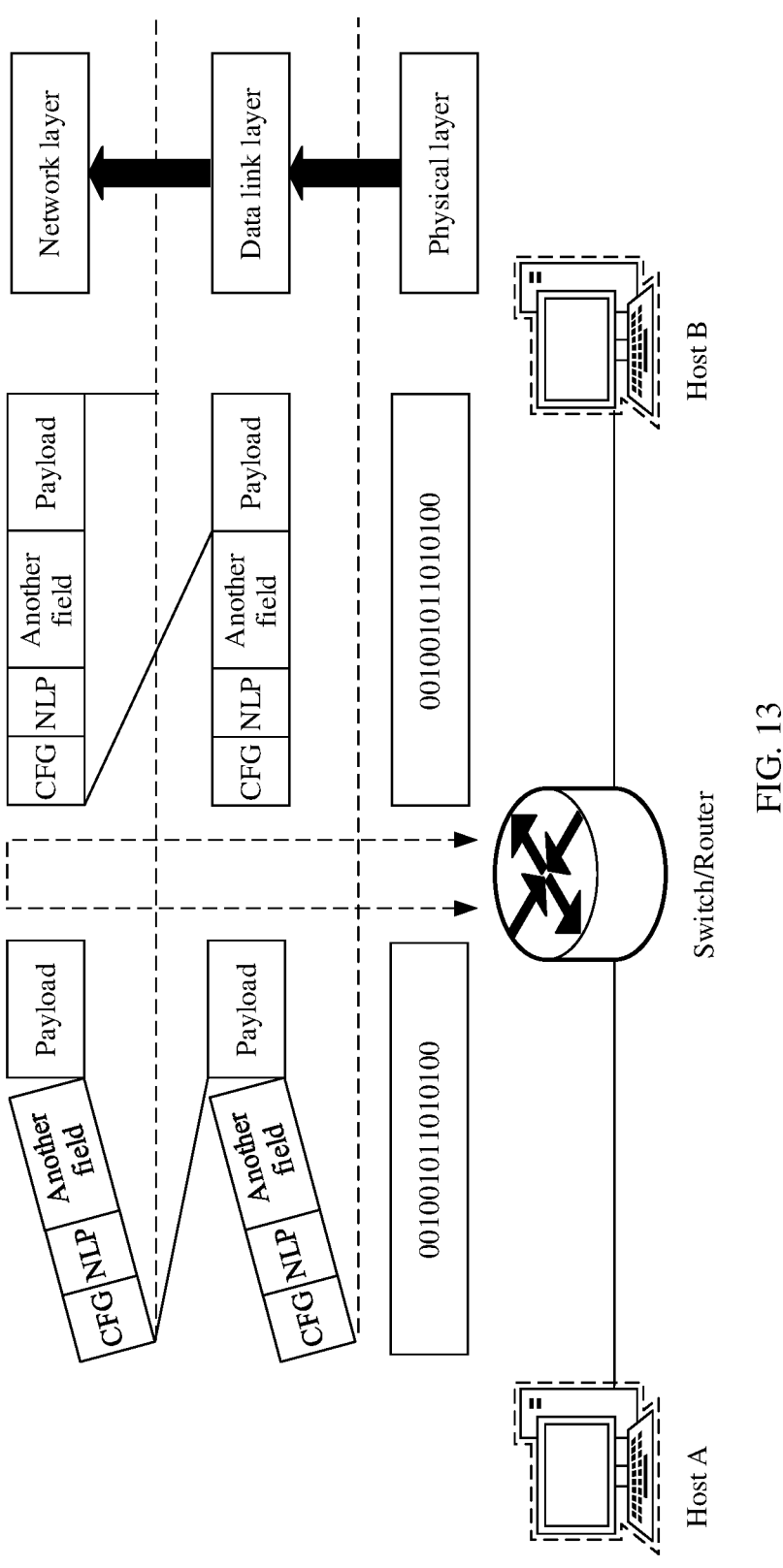
FIG. 13 is an example schematic diagram of processing in which a switch/router parses a packet header of a data packet to implement packet forwarding according to an embodiment of this application.

A switch/router mainly forwards packets. FIG. 13 is a schematic diagram of processing in which a switch/router parses a packet header of a data packet to implement packet forwarding. After receiving the data packet, the switch/router parses a packet header at an outermost protocol layer based on a value of a CFG field, and identifies fields such as a forwarding address field in the packet header for forwarding. If the switch/router needs to parse a packet header at an inner protocol layer to determine a forwarding action, the switch/router parses a corresponding packet header based on a upper protocol layer indicated by an NLP field to identify a forwarding address and forwards the packet. A packet header of the data packet shown in FIG. 13 includes a network layer and a data link layer. FIG. 13 is merely used as an example. For example, the packet header of the data packet may alternatively not include the network layer, or may include a plurality of protocol layers at the network layer.

For example, the switch or the router may include first configuration information or second configuration information, and may further include fourth configuration information or fifth configuration information. For another example, the switch works at the data link layer. The switch may configure only a correspondence between different values of NLP fields and different protocol layers for the data link layer, and a correspondence between different values of CFG fields and different protocol layer packet header formats for the data link layer. For example, the switch/router works at the network layer. The switch may configure correspondences between different values of NLP fields and different protocol layers for the data link layer and the network layer, and correspondences between different values of CFG fields and different protocol layers for the data link layer and the network layer.

In addition, an example in which the first possible implementation is separately implemented is used for detailed description.

A packet header included at each protocol layer includes an NLP field. The NLP field indicates which protocol layer is an upper layer (inner layer) protocol layer of a current protocol layer, or is described as a protocol type at the upper layer protocol layer indicated by the NLP field. For example, an outer protocol layer of a first protocol layer is a second protocol layer. A packet header at the second protocol layer includes a value of an NLP field indicating that an inner protocol layer of the second protocol layer is the first protocol layer.

The first protocol layer and the second protocol layer may be two adjacent layers in seven layers included in an OSI model. Alternatively, the first protocol layer and the second protocol layer may be two non-adjacent layers in seven layers included in an OSI model. Alternatively, the first protocol layer and the second protocol layer are a same layer in seven layers included in an OSI model, for example, to a network layer. Packet headers at a plurality of protocol layers are encapsulated in the network layer.

In an example, the NLP field may occupy a fixed location in a protocol layer packet header. For example, the NLP field occupies a fixed quantity of bits at a beginning of a packet header at the second protocol layer. Alternatively, the NLP field occupies a fixed quantity of bits at an end at the second protocol layer. Alternatively, the NLP field occupies a fixed quantity of bits at an intermediate location at the second protocol layer. The NLP field is located in a same position at different protocol layers. For example, at each protocol layer, the NLP field occupies a fixed quantity of bits at a beginning of the packet header. Therefore, the receiving end can parse the NLP field at each protocol layer at the fixed location, to learn of a protocol type of the inner protocol layer, and then parse the packet header of the inner protocol layer.

In some embodiments, at a same protocol layer, different values of the NLP field indicate different protocol types. In an example, different protocol layers may be configured in a unified manner. To be specific, at different protocol layers, a same value of NLP fields indicates a same protocol type. In another example, meanings represented by values of NLP fields at different protocol layers may be defined based on requirements of layers. At different protocol layers, a same value of NLP fields may indicate different protocol types. For example, in the first protocol layer and the second protocol layer, if values of NLP fields are both 1, indicated protocol types may be different.

When a host server at a transmitting end encapsulates a packet, from top to bottom, each protocol layer adds a value of an NLP field and a value of another field in a packet header, and a data packet to which the packet header is added is sent to a lower protocol layer. The lower protocol layer determines a protocol type at the upper protocol layer, and adds a value of an NLP field and a value of another field in a packet header. The data packet encapsulated by adding a packet header layer by layer is sent to a network. The host server at the transmitting end encapsulates user data in a data packet. A packet header of the data packet includes packet headers at N protocol layers. The host server at the transmitting end sends the data packet to a host server at a receiving end. For example, the N protocol layers include at least a first protocol layer and a second protocol layer. An inner layer of the second protocol layer is the first protocol layer. A packet header at the second protocol layer includes an NLP field. A value of the NLP field at the second protocol layer indicates that the inner layer of the second protocol layer is the first protocol layer. Specifically, a data packet in which the packet header at the first protocol layer is encapsulated is referred to as a first data packet, and a data packet in which the packet header at the second protocol layer is encapsulated is referred to as a second data packet. The host server at the transmitting end obtains the first data packet in which the packet header at the first protocol layer is encapsulated, determines that an outer layer of the first protocol layer is the second protocol layer, and then encapsulates the packet header at the second protocol layer in the first data packet to obtain the second data packet. The packet header of the second protocol layer includes the NLP field. The value of the NLP field in the packet header at the second protocol layer indicates that the inner layer of the second protocol layer is the first protocol layer.

In a possible implementation, a correspondence between an NLP value and a protocol layer is configured in the host server. For details, refer to related descriptions of the first configuration information and the second configuration information.

After receiving the data packet from a transmitting end, the host server at the receiving end performs decapsulation from bottom to top (or from an outer layer to an inner layer). After each layer is decapsulated, an upper protocol layer is determined based on an indication of an NLP field at a current protocol layer, to further decapsulate a packet header at the upper protocol layer. User data of the transmitting end is obtained through layer-by-layer decapsulation. The following uses decapsulation at a first protocol layer and a second protocol layer as an example. The host server at the receiving end receives the data packet. The user data from the transmitting end and packet headers at N protocol layers are encapsulated in the data packet. The N protocol layers include at least the first protocol layer and the second protocol layer. A packet header at the second protocol layer includes a first field. A value of an NLP field in the packet header at the second protocol layer indicates that the inner layer of the second protocol layer is the first protocol layer. When the packet header at the second protocol layer is decapsulated for the data packet, a packet header at the first protocol layer is decapsulated based on the value of the NLP field in the packet header at the second protocol layer.

After receiving the data packet, the switch/router parses a packet header at an outermost protocol layer, and identifies fields such as a forwarding address field in the packet header for forwarding. If the switch/router needs to parse a packet header at an inner layer to determine a forwarding action, the switch/router parses a corresponding packet header based on a lower protocol layer indicated by an NLP field to identify a forwarding address and forwards the packet.

In addition, an example in which the second possible implementation is separately implemented is used for detailed description.

A packet header included at each protocol layer includes a CFG field. The CFG field indicates the packet header format at the current protocol layer. Different values of the CFG field indicate different packet header formats used at the second protocol layer.

In an example, the CFG field may occupy a fixed location in a protocol layer packet header. For example, the CFG field occupies a fixed quantity of bits at a beginning of a packet header at the protocol layer. Alternatively, the CFG field occupies a fixed quantity of bits at an end at the protocol layer. Alternatively, the CFG field occupies a fixed quantity of bits at an intermediate location at the protocol layer. The CFG field is located in a same position at different protocol layers. For example, at each protocol layer, the CFG field occupies a fixed quantity of bits at a beginning of the packet header. Refer to FIG. 13. Therefore, the receiving end can parse the CFG field at each protocol layer at the fixed location, to learn of a protocol type of the inner protocol layer, and then parse the packet header of the inner protocol layer.

In some embodiments, at a same protocol layer, different values of the CFG field indicate different packet header formats. In an example, different protocol layers may be configured in a unified manner. To be specific, at different protocol layers, a same value of CFG fields indicates a same packet header format. In another example, meanings represented by values of CFG fields at different protocol layers may be defined based on requirements of layers. At different protocol layers, a same value of CFG fields may indicate different packet header formats. For example, in the first protocol layer and the second protocol layer, if values of CFG fields are both 1, indicated packet header formats may be different.

When a host server at a transmitting end encapsulates a packet, from top to bottom, each protocol layer adds a value of a CFG field and a value of another field in a packet header, and a data packet to which the packet header is added is sent to a lower protocol layer. The lower protocol layer determines a protocol type at the upper protocol layer, and adds a value of a CFG field and a value of another field in a packet header. The data packet encapsulated by adding a packet header layer by layer is sent to a network. The host server at the transmitting end encapsulates user data in a data packet. A packet header of the data packet includes packet headers at N protocol layers. The host server at the transmitting end sends the data packet to a host server at a receiving end. Each packet header at the N protocol layers includes a CFG field, and a value of the CFG field in each protocol layer packet header indicates a packet header format at the protocol layer. A second protocol layer is used as an example. A packet header at the second protocol layer includes a CFG field, and a value of the CFG field indicates a packet header format at the second protocol layer.

After receiving a data packet from the transmitting end, the host server at the receiving end performs decapsulation from bottom to top (or from an outer layer to an inner layer). Specifically, each layer determines a packet header format at a current protocol layer based on an indication of a CFG field at the current protocol layer, and performs decapsulation based on the packet header format at the current protocol layer. User data of the transmitting end is obtained through layer-by-layer decapsulation. The following uses decapsulation at a second protocol layer as an example. The host server at the receiving end receives the data packet. The user data from the transmitting end and packet headers at N protocol layers are encapsulated in the data packet. The N protocol layers include at least a first protocol layer and the second protocol layer. A packet header at the second protocol layer includes a CFG field. A packet header format at the second protocol layer is determined based on a value of the CFG field at a fixed position in the packet header at the second protocol layer, to decapsulate the packet header at the second protocol layer.

In a possible implementation, a correspondence between a CFG value and a packet header format is configured in the host server.

With reference to a specific application scenario, the following describes the solutions provided in embodiments of this application.

A first possible application scenario is a small-scale network scenario including one subrack or one cabinet, a cable is short, hardware signal reliability is high, and a hardware physical layer can ensure data reliability. In this network scenario, a transport layer is not required. Based on the characteristics of the foregoing service scenarios, network protocol layers can be simplified when data packets are encapsulated or decapsulated.

Figure 14:
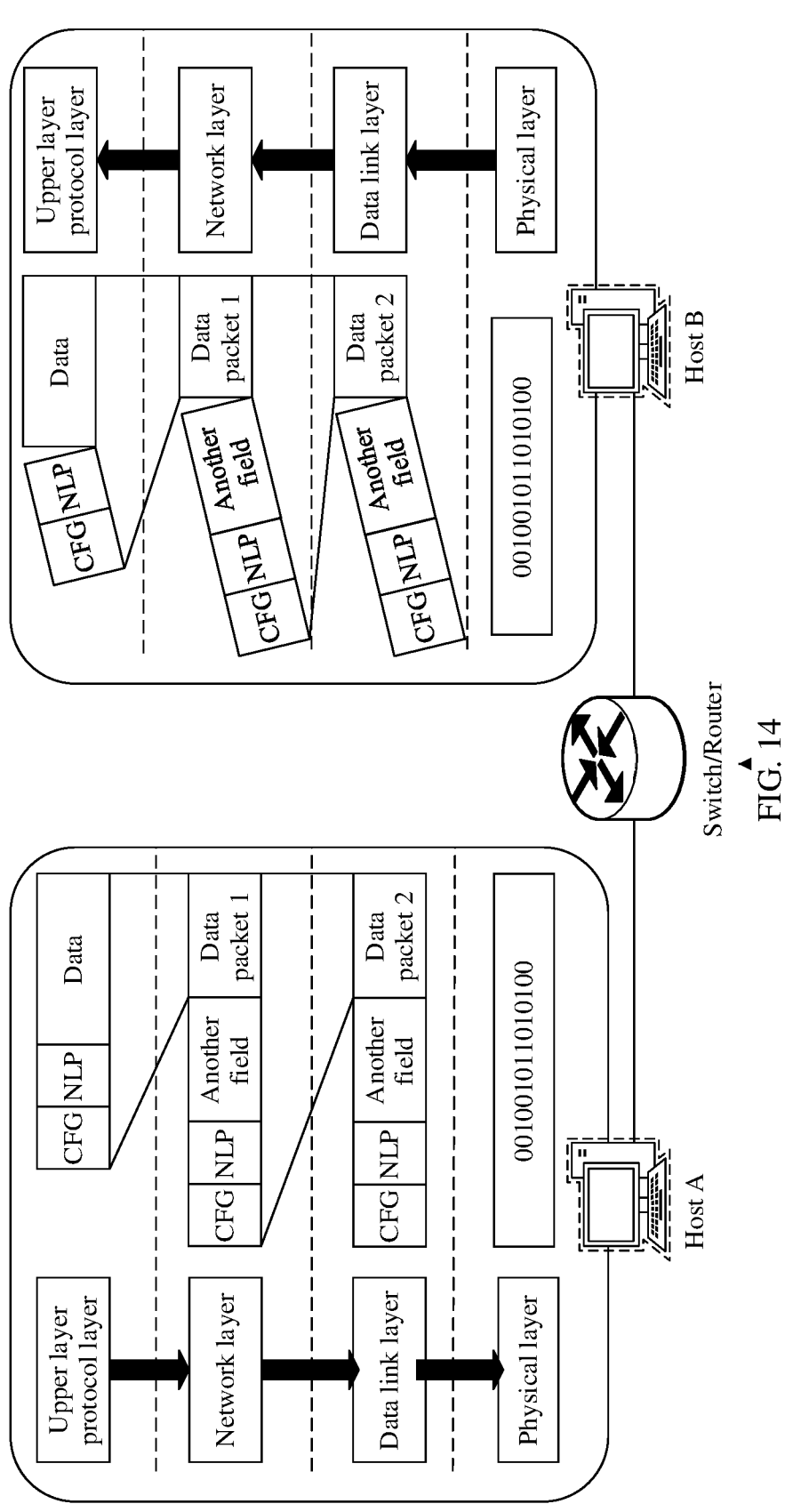
FIG. 14 is an example schematic diagram of an architecture of a small-scale network system of a subrack or a cabinet according to an embodiment of this application.

In the first possible application scenario, during encapsulation or decapsulation, an upper layer protocol layer (which may also be referred to as a higher layer), a network layer, a data link layer, and a physical layer may be sequentially included from top to bottom. FIG. 14 is a schematic diagram of an architecture of a small-scale network system in which one subrack or one cabinet is used. The network system includes a host A and a host B, and the host A and the host B are connected through a switch or a router. In FIG. 14, an example in which the upper layer protocol layer (also referred to as a higher layer protocol layer), the network layer, the data link layer, and the physical layer each include one protocol layer is used. In some embodiments, the network layer or the data link layer may alternatively include a plurality of protocol layers. For example, a plurality of protocol layer packet headers may be encapsulated at the network layer. For another example, a plurality of protocol layer packet headers may be encapsulated at the data link layer. This is not specifically limited in this embodiment of this application.

Communication between the host A and the host B is used as an example. The host A performs data encapsulation at the higher layer. There is no other protocol layer above the higher layer, and a value of an NLP field in a packet header at the higher layer may be a default value. A corresponding value is added to a CFG field at the higher layer based on a configured or negotiated packet header format. A data packet in which a packet header at a higher layer protocol layer is encapsulated is referred to as a data packet (DATA) 1. After the data packet is encapsulated, the transport layer is skipped, and the higher layer protocol layer directly invokes the network layer to encapsulate the data packet 1. If the network layer determines that an upper layer is the higher layer protocol layer, the network layer encapsulates a network layer packet header in the data packet 1, adds a value indicating the higher layer protocol layer to the NLP field in the packet header, and adds a value indicating a network layer packet header format to the CFG field. A data packet in which the network layer packet header is encapsulated is referred to as a data packet (DATA) 2. The network layer then invokes the data link layer to encapsulate the data packet 2. If the data link layer determines that an upper layer is the network layer, the data link layer encapsulates a data link layer packet header in the data packet 2, adds a value indicating the network layer to the NLP field in the packet header, and adds a value indicating a data link layer packet header format to the CFG field. A data packet in which the data link layer packet header is encapsulated is referred to as a data packet (DATA) 3. The data packet 3 is sent through the network interface card.

The switch forwards the packet to the host at the receiving end based on address information at the data link layer and network layer.

The host B receives the data packet 3, decapsulates a packet header of the data packet 3 from bottom to top, first parses the CFG field at the data link layer, parses the packet header at the data link layer based on the value of the CFG field at the data link layer, then identifies the NLP field at the data link layer, determines that a next protocol layer is a protocol layer at the network layer, and sends the entire data packet 2 from which the packet header at the data link layer is stripped to the network layer for processing. The network layer parses the CFG field at the network layer, parses the packet header at the protocol layer at the network layer based on the value of the CFG field at the protocol layer at the network layer, then identifies the NLP field at the protocol layer at the network layer, determines that a next protocol layer is the higher layer protocol layer, and sends the entire data packet 1 from which the packet header at the protocol layer at the network layer is stripped to the higher layer protocol layer, to obtain user data through processing at the higher layer protocol layer, and finally sends the user data to service software.

A second possible application scenario is a large-scale network scenario including a plurality of cabinets. In an example, hosts/devices located in a same cabinet are generally small in scale, and a network layer may have fewer fields, and a bit width may be smaller, to improve transmission efficiency and resource utilization. For example, a bit width occupied by a forwarding address may be smaller, and a field (hereinafter referred to as a QoS field) indicating quality of service (QoS) may be shorter. Optionally, between hosts/devices located in a same cabinet, a communication cable is short and hardware signal reliability is high. A hardware physical layer can ensure data reliability without a transport layer. In another example, when hosts/devices located in different cabinets communicate with each other, a large quantity of fields are required at the network layer, and a small bit width may not be implemented. For example, a bit width occupied by a forwarding address at a network layer is greater than a bit width used for communication between devices in a cabinet, and a bit width occupied by a field indicating quality of service (QoS) is greater than a bit width of a QoS field used for communication between devices in a cabinet.

In an example, the field indicating quality of service (QoS) may be a priority (Priority) field in a protocol layer packet header at a network layer. A higher priority value indicates that more resources can be obtained during transmission in a network, and scheduling and processing can be performed in a timelier manner.

Figure 15:
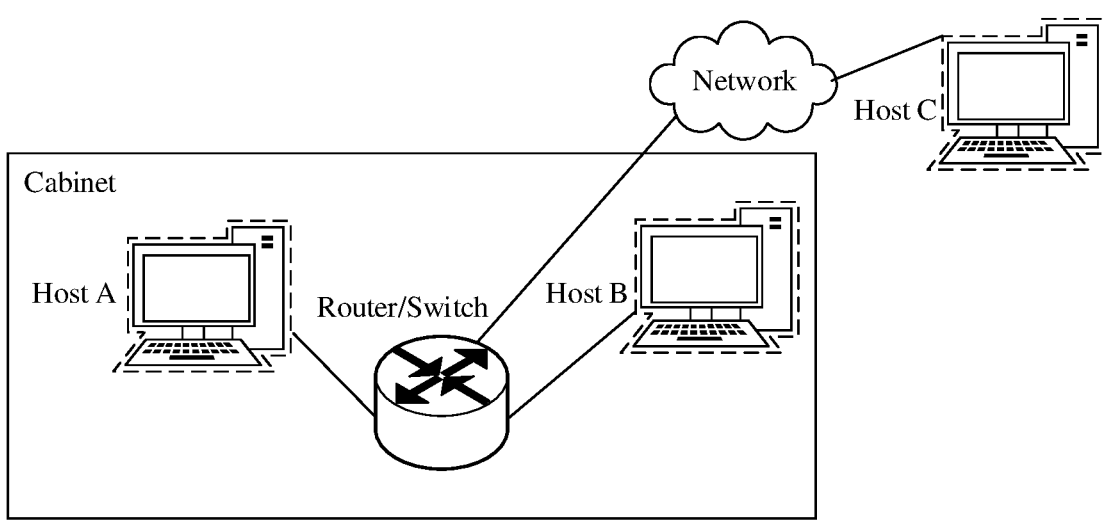
FIG. 15 is an example schematic diagram of an architecture of a large-scale network system including a plurality of cabinets according to an embodiment of this application.

FIG. 15 is a schematic diagram of an architecture of a large-scale network system including a plurality of cabinets. A network system includes a host A, a host B, and a host C. The host A, the host B, and the host C may communicate with each other through a router or a switch. The host A and the host B are in a same cabinet. The host A and the host B belong to different cabinets.

In an example, in the network system, two types of protocol layer packet header format are defined for a network layer. One is a simplified protocol layer packet header format. The other is a standard protocol layer packet header. For example, in a simplified protocol layer packet header, a quantity of bits occupied by an address is less than a quantity of bits occupied by an address field in the standard protocol layer packet header. For example, in the simplified protocol layer packet header, a source address field and a destination address field each occupy 16 bits; and in the standard protocol layer packet header, a source address field and a destination address field each occupy 8 bits. For another example, in the simplified protocol layer packet header, a quantity of bits occupied by a QoS field is less than a quantity of bits occupied by QoS in the standard protocol layer packet header. For example, in the simplified protocol layer packet header, the QoS field occupies 4 bits; and in the standard protocol layer packet header, the QoS field occupies 8 bits. For example, in a CFG field, a value 0 indicates that the simplified protocol layer packet header format is used at a network layer, and a value 1 indicates that the standard protocol layer packet header format is used at the network layer.

In a possible example, communication between the host A and the host B is used as an example. The host A functions as a transmitting end, and the host B functions as a receiving end.

The host A performs data encapsulation at the higher layer. There is no other protocol layer above the higher layer, and a value of an NLP field in a packet header at the higher layer may be a default value. A corresponding value is added to a CFG field at the higher layer based on a configured or negotiated packet header format. A data packet in which a packet header at a higher layer protocol layer is encapsulated is referred to as a data packet (DATA) 1. After the data packet is encapsulated, a transport layer is skipped, and the higher layer protocol layer directly invokes the network layer to encapsulate the data packet 1. If the network layer determines that an upper layer is the higher layer protocol layer, the network layer encapsulates a network layer packet header in the data packet 1, and adds a value indicating the higher layer protocol layer to an NLP field in the packet header. Because the host B and the host A are located in a same cabinet, when a destination IP address is the host B, a protocol layer packet header format configured at the network layer is the simplified protocol layer packet header format, and the network layer adds 0 to the CFG field in the packet header. A data packet in which the packet header at the network layer is encapsulated is called a data packet (DATA) 2. The network layer then invokes the data link layer to encapsulate the data packet 2. If the data link layer determines that an upper layer is the network layer, the data link layer encapsulates a data link layer packet header in the data packet 2, adds a value indicating the network layer to the NLP field in the packet header, and adds a value indicating a data link layer packet header format to the CFG field. A data packet in which the data link layer packet header is encapsulated is referred to as a data packet (DATA) 3. The data packet 3 is sent through the network interface card.

The switch/router decapsulates the protocol layer packet header at the network layer based on the simplified protocol layer packet header format indicated by the value 0 of the CFG field at the network layer, to obtain the destination address, and forwards the packet to the host B.

The host B receives the data packet 3, decapsulates a packet header of the data packet 3 from bottom to top, first parses the CFG field at the data link layer, parses the packet header at the data link layer based on the value of the CFG field at the data link layer, then identifies the NLP field at the data link layer, determines that a next protocol layer is a protocol layer at the network layer, and sends the entire data packet 2 from which the packet header at the data link layer is stripped to the network layer for processing. The network layer learns through parsing that the value of the CFG field at the network layer is 0, decapsulates the protocol layer packet header at the network layer based on the simplified protocol layer packet header format indicated by the value 0 of the CFG field at the network layer, determines, based on the value of the NLP field, that a next protocol layer is a higher layer protocol layer, sends the entire data packet 1 from which the protocol layer packet header at the network layer is stripped to the higher layer protocol layer, to obtain user data through processing at the higher layer protocol layer, and finally sends the user data to service software.

In another possible example, communication between the host A and the host C is used as an example. The host A functions as a transmitting end, and the host C functions as a receiving end.

The host A performs data encapsulation at the higher layer. There is no other protocol layer above the higher layer, and a value of an NLP field in a packet header at the higher layer may be a default value. A corresponding value is added to a CFG field at the higher layer based on a configured or negotiated packet header format. A data packet in which a packet header at a higher layer protocol layer is encapsulated is referred to as a data packet (DATA) 11. After the data packet 11 is encapsulated, the higher layer protocol layer invokes the transport layer to encapsulate a protocol layer packet header at the transport layer for the data packet 11. The transport layer determines that an upper layer is a higher layer protocol layer, encapsulates the protocol layer packet header at the transport layer based on a configured or negotiated protocol layer packet header format, adds a corresponding value to the CFG field, and adds a value indicating the higher layer protocol layer to the NLP field in the packet header, to obtain a data packet 12. The transport layer invokes the network layer to encapsulate the data packet 12. If the network layer determines that an upper layer is the protocol layer at the transport layer, the network layer encapsulates a network layer packet header in the data packet 12, and adds a value indicating the protocol layer at the transport layer to an NLP field in the packet header. Because the host C and the host A are located in different cabinets, when a destination IP address is the host C, a protocol layer packet header format configured at the network layer is the standard protocol layer packet header format, and the network layer adds 1 to the CFG field in the packet header. A data packet in which the packet header at the network layer is encapsulated is called a data packet (DATA) 13. The network layer then invokes the data link layer to encapsulate the data packet 13. If the data link layer determines that an upper layer is the network layer, the data link layer encapsulates a data link layer packet header in the data packet 13, adds a value indicating the network layer to the NLP field in the packet header, and adds a value indicating a data link layer packet header format to the CFG field. A data packet in which the data link layer packet header is encapsulated is referred to as a data packet (DATA) 14. The data packet 14 is sent through the network interface card.

The switch/router decapsulates the protocol layer packet header at the network layer based on the standard protocol layer packet header format indicated by the value 1 of the CFG field at the network layer, to obtain the destination address, and forwards the packet to the host C.

The host C receives the data packet 14, decapsulates a packet header of the data packet 14 from bottom to top, first parses the CFG field at the data link layer, parses the packet header at the data link layer based on the value of the CFG field at the data link layer, then identifies the NLP field at the data link layer, determines that a next protocol layer is a protocol layer at the network layer, and sends the entire data packet 13 from which the packet header at the data link layer is stripped to the network layer for processing. The network layer learns through parsing that the value of the CFG field at the network layer is 1, decapsulates the protocol layer packet header at the network layer based on the simplified protocol layer packet header format indicated by the value 1 of the CFG field at the network layer, determines, based on the value of the NLP field, that a next protocol layer is the transport layer, sends the entire data packet 12 from which the protocol layer packet header at the network layer is stripped to the protocol layer at the transport layer, decapsulates the protocol layer packet header at the transport layer based on the value of the CFG field at the transport layer, determines, based on the value of the NLP field, that a next protocol layer is the higher layer protocol layer, sends the entire data packet 11 from which the protocol layer packet header at the transport layer is stripped is sent to the higher layer protocol layer, to obtain user data through processing at the higher layer protocol layer, and finally sends the user data to the service software.

Figure 16:
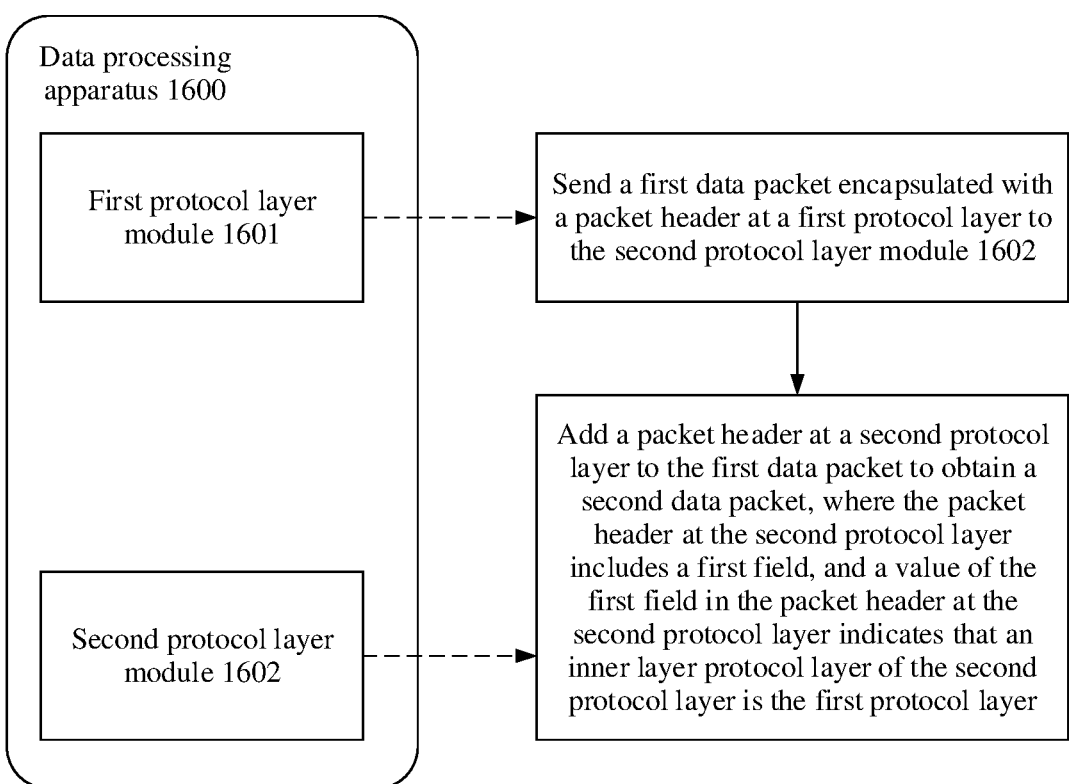
FIG. 16 is an example schematic diagram of a structure of a data processing apparatus 1600 according to an embodiment of this application.

Based on a same technical concept as the foregoing method, an embodiment of this application provides a data processing apparatus 1600. Refer to FIG. 16. The apparatus 1600 is applied to a network device, and may be implemented by a processor in the network device, or may be implemented by a network interface card in the network device. The data processing apparatus 1600 is configured to implement the method implemented by the host, the switch, the processor, or the network interface card in any one of the foregoing embodiments. The data processing apparatus may include a first protocol layer module 1601 and a second protocol layer module 1602.

In a first possible application scenario:

The first protocol layer module 1601 is configured to send a first data packet encapsulated with a packet header at a first protocol layer to the second protocol layer module 1602. The second protocol layer module 1602 is configured to encapsulate a packet header at a second protocol layer in the first data packet to obtain a second data packet (or add a packet header at a second protocol layer to the first data packet to obtain a second data packet). The packet header at the second protocol layer includes a first field. A value of the first field in the packet header at the second protocol layer indicates that an inner layer of the second protocol layer is the first protocol layer. In FIG. 16, the first possible application scenario is used as an example.

In a second possible application scenario:

The second protocol layer module 1602 is configured to receive a data packet. Data from a first network device and packet headers at N protocol layers are encapsulated in the data packet. The N protocol layers include at least a first protocol layer and a second protocol layer. A packet header at the second protocol layer includes a first field. A value of the first field in the packet header at the second protocol layer indicates that an inner layer of the second protocol layer is the first protocol layer. When decapsulating the packet header at the second protocol layer for the data packet to obtain a second data packet, the second protocol layer module 1602 sends, to the first protocol layer module 1601 based on the value of the first field in the packet header at the second protocol layer, the second data packet obtained after the packet header at the second protocol layer is decapsulated. The first protocol layer module 1601 is configured to decapsulate a packet header at the first protocol layer.

In a third possible application scenario:

The first protocol layer module 1601 is configured to send a first data packet encapsulated with a packet header at a first protocol layer to the second protocol layer module 1602. The second protocol layer module 1602 is configured to: when an outer protocol layer of the first protocol layer is a second protocol layer, encapsulate a packet header at the second protocol layer in the first data packet to obtain a second data packet. The packet header at the second protocol layer includes a second field. A value of the second field in the packet header at the second protocol layer indicates a packet header format used at the second protocol layer. Different values of the second field indicate different packet header formats used at the second protocol layer.

In a fourth possible application scenario:

The second protocol layer module 1602 is configured to receive a data packet. Data from a first network device and packet headers at N protocol layers are encapsulated in the data packet. The N protocol layers include at least a second protocol layer. A packet header at the second protocol layer includes a second field. A value of the second field at the second protocol layer indicates a packet header format used at the second protocol layer. When decapsulating the packet header at the second protocol layer for the data packet, the second protocol layer module 1602 decapsulates the packet header at the second protocol layer based on the value of the second field at the second protocol layer.

Figure 17:
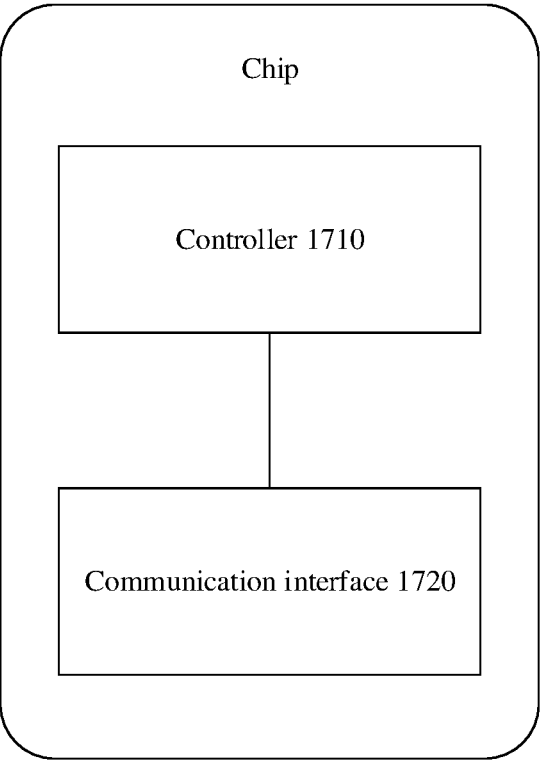
FIG. 17 is an example schematic diagram of a structure of a chip according to an embodiment of this application.

FIG. 17 is a schematic diagram of a structure of a chip according to an embodiment of this application. The chip in this embodiment shown in FIG. 17 may include a controller 1710 and a communication interface 1720. The controller 1710 and the communication interface 1720 cooperate with each other, so that the chip performs the method performed by the network interface card or the method performed by the processor in the foregoing embodiments. The controller 1710 may be a central controller (e.g., CPU), a general-purpose processor, a co-controller, a digital signal controller (digital signal processor, DSP), an application-specific integrated circuit (ASIC), a field programmable gate array (FPGA) or another programmable logic device, a transistor logic device, a hardware component, or any combination thereof. The controller may alternatively be a combination of computing functions, for example, a combination of one or more microcontrollers or a combination of a DSP and a microcontroller.

In addition, this application further provides a computer-readable storage medium. The computer-readable storage medium stores a computer program. When the computer program is executed by a computing device, the method implemented by the host, the switch, the processor, or the network interface card is implemented.

In addition, this application further provides a computer program product. The computer program product includes computer instructions. When the computer instructions are executed by a computing device, the method implemented by the host, the switch, the processor, or the network interface card is implemented.

Based on a same technical concept, a problem-resolving principle of the data processing apparatus provided in embodiments of this application is similar to that of the method embodiments of this application. Therefore, for implementation of the data processing apparatus, refer to the implementation of the method.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A data processing method applied to a first network device, the data processing method comprising:
  obtaining a first data packet, wherein a first packet header at a first protocol layer is encapsulated in the first data packet; and
  obtaining a second data packet by adding a second packet header at a second protocol layer to the first data packet, wherein0
    the second protocol layer is an outer layer of the first protocol layer,
    the second packet header at the second protocol layer includes a first field,
    a value of the first field, in the second packet header at the second protocol layer, indicates an inner layer of the second protocol layer is the first protocol layer,
    the first data packet includes data to be sent to a second network device, and
    the method further comprises:
    negotiating protocol layer information with the second network device, wherein the protocol layer information indicates a protocol layer for encapsulating the data to be sent to the second network device and an adjacency relationship between different protocol layers,
    the second packet header at the second protocol layer further includes a second field, and
    a value of the second field, in the second packet header at the second protocol laver, indicates a packet header format used at the second protocol layer.

2. The method according to claim 1, wherein
  the first protocol layer and the second protocol layer are two adjacent layers in seven layers included in an open systems interconnection (OSI) model,
  the first protocol layer and the second protocol layer are two non-adjacent layers in the seven layers included in the OSI model, or the first protocol layer and the second protocol layer are a same layer in the seven layers included in the OSI model.

3. The method according to claim 1, wherein before obtaining the second data packet, the method further comprises:
  determining the value of the first field, in the second packet header at the second protocol layer, based on first configuration information, wherein
  the first configuration information includes a correspondence between different values of the first field and different protocol layers.

4. The method according to claim 1, wherein obtaining the second data packet, the method further comprises:
  determining the value of the first field, in the second packet header at the second protocol layer, based on second configuration information corresponding to the second protocol layer, wherein
  the second configuration information includes a correspondence between different values of the first field and different protocol layers at the second protocol layer.

5. The method according to claim 1, further comprising:
  determining the second protocol layer is the outer layer of the first protocol layer based on third configuration information, wherein
  the third configuration information indicates a protocol layer for encapsulating a data packet and the adjacency relationship between different protocol layers.

6. The method according to claim 1, wherein obtaining the second data packet comprises:
  determining the packet header format at the second protocol layer based on indication information; and
  obtaining the second data packet by encapsulating the second packet header at the second protocol layer in the first data packet based on the determined packet header format at the second protocol layer.

7. The method according to claim 6, further comprising:
  receiving the indication information from a network management device.

8. A data processing apparatus, comprising:
  a processor; and
  a network interface card, wherein the processor and network interface card act in cooperation and cause the data processing apparatus to:
    receive a data packet sent by the network interface card, or send a data packet to the network interface cards;
    obtain a first data packet, wherein a first packet header at a first protocol layer is encapsulated in the first data packet; and
    obtain a second data packet by adding a second packet header at a second protocol layer to the first data packet, wherein
      the second protocol layer is an outer layer of the first protocol layer,
      the second packet header at the second protocol layer includes a first field,
      a value of the first field, in the second packet header at the second protocol layer, indicates an inner layer of the second protocol layer is the first protocol layer,
      the first data packet includes data to be sent to a second network device, and the apparatus is further caused to:
        negotiate protocol layer information with the second network device, wherein the protocol layer information indicates a protocol layer for encapsulating the data to be sent to the second network device and an adjacency relationship between different protocol lavers, the second packet header at the second protocol layer further includes a second field, and a value of the second field, in the second packet header at the second protocol layer, indicates a packet header format used at the second protocol laver.

9. The apparatus according to claim 8, wherein the first protocol layer and the second protocol layer are two adjacent layers in seven layers included in an open systems interconnection (OSI) model, the first protocol layer and the second protocol layer are two non-adjacent layers in the seven layers included in the OSI model, or the first protocol layer and the second protocol layer are a same layer in the seven layers included in the OSI model.

10. The apparatus according to claim 8, wherein the apparatus is further caused to:

determine the value of the first field in the second packet header at the second protocol layer based on first configuration information, wherein the first configuration information includes a correspondence between different values of the first field and different protocol layers.

11. The apparatus according to claim 8, wherein the apparatus is further caused to:

determine the value of the first field in the second packet header at the second protocol layer based on second configuration information corresponding to the second protocol layer, wherein the second configuration information includes a correspondence between different values of the first field and different protocol layers at the second protocol layer.

12. The apparatus according to claim 8, wherein the apparatus is further caused to:

determine the second protocol layer is the outer layer of the first protocol layer based on third configuration information, wherein the third configuration information indicates a protocol layer for encapsulating a data packet and the adjacency relationship between different protocol layers.

13. The apparatus according to claim 8, wherein the apparatus is further caused to:

determine the packet header format at the second protocol layer based on indication information; and obtain the second data packet by encapsulating the second packet header at the second protocol layer in the first data packet based on the determined packet header format at the second protocol layer.

14. The apparatus according to claim 13, wherein the apparatus is further caused to:

receive the indication information from a network management device.

15. The method according to claim 1, wherein the first field is a next layer protocol (NLP) field.

16. The method according to claim 1, wherein the second field is a configuration (CFG) field.

\*   \*   \*   \*   \*